US011875711B2

(12) United States Patent
Wesley et al.

(10) Patent No.: US 11,875,711 B2
(45) Date of Patent: Jan. 16, 2024

(54) ARTICULATING DIGITAL MENU BOARD AND RELATED METHODS

(71) Applicant: LSI Industries, Inc., Cincinnati, OH (US)

(72) Inventors: Nelson C. Wesley, Cincinnati, OH (US); Gerard Combs, Dry Ridge, KY (US); Robert Uzzolino, Burlington, KY (US); Donald Lunnemann, Florence, KY (US); James Bradley, Independence, KY (US)

(73) Assignee: LSI Industries, Inc., Cincinnati, OH (US)

( * ) Notice: Subject to any disclaimer, the term of this patent is extended or adjusted under 35 U.S.C. 154(b) by 0 days.

(21) Appl. No.: 17/717,687

(22) Filed: Apr. 11, 2022

(65) Prior Publication Data

US 2022/0327968 A1 Oct. 13, 2022

Related U.S. Application Data

(60) Provisional application No. 63/174,134, filed on Apr. 13, 2021.

(51) Int. Cl.

| | |
|---|---|
| ***G09F 7/22*** | (2006.01) |
| *G09F 7/18* | (2006.01) |
| *E06B 11/02* | (2006.01) |

(52) U.S. Cl.

CPC ................ *G09F 7/22* (2013.01); *E06B 11/02* (2013.01); *G09F 2007/1834* (2013.01); *G09F 2007/1873* (2013.01)

(58) Field of Classification Search

CPC ............... G09F 7/22; G09F 2007/1834; G09F 2007/1873; G09F 9/3026; E06B 11/02; E06B 11/028

USPC .............................................................. 49/49

See application file for complete search history.

(56) References Cited

U.S. PATENT DOCUMENTS

| | | | | |
|---|---|---|---|---|
| 1,412,769 A * | 4/1922 | Barnes | E06B 11/02 40/606.03 |
| 1,451,247 A * | 4/1923 | Weymer | E06B 11/02 256/73 |
| 6,691,467 B2 * | 2/2004 | Hincher, Sr. | E06B 9/04 362/152 |
| 6,711,854 B1 * | 3/2004 | Andersen | E06B 9/02 49/55 |
| 8,472,174 B2 | 6/2013 | Idems et al. | |

(Continued)

FOREIGN PATENT DOCUMENTS

| | | |
|---|---|---|
| CN | 210691431 U * | 6/2020 |
| CN | 210691431 U | 6/2020 |

(Continued)

*Primary Examiner* — Cassandra Davis

(74) *Attorney, Agent, or Firm* — Wood Herron & Evans LLP

(57) ABSTRACT

An illuminated display device that includes a hinge post, a support post positioned in a laterally spaced relationship to the hinge post, and at least one support arm pivotably coupled to the hinge post and movable between a first position and an second position. The at least one support arm is configured to engage with the support post when moved to the first position. The illuminated display device further includes a display assembly supported by the at least one support arm and configured to support at least one display screen.

21 Claims, 20 Drawing Sheets

(56) References Cited

U.S. PATENT DOCUMENTS

| | | | | |
|---|---|---|---|---|
| 10,400,946 | B2 | 9/2019 | Bennett et al. | |
| 2004/0226203 | A1 | 11/2004 | Yenglin et al. | |
| 2008/0236005 | A1 | 10/2008 | Isayev et al. | |
| 2008/0236045 | A1 * | 10/2008 | DeBlonk | G09F 9/3026 49/70 |
| 2011/0010972 | A1 | 1/2011 | Venetucci et al. | |
| 2015/0181729 | A1 | 6/2015 | Lewis | |

FOREIGN PATENT DOCUMENTS

| | | | | | |
|---|---|---|---|---|---|
| CN | 211201702 | U | * | 8/2020 | |
| DE | 4124567 | A1 | * | 1/1993 | G02B 6/0031 |

* cited by examiner

ARTICULATING DIGITAL MENU BOARD AND RELATED METHODS

CROSS-REFERENCE TO RELATED APPLICATION

The present application claims the filing benefit of U.S. Provisional Application Ser. No. 63/174,134, filed Apr. 13, 2021, the disclosure of which is incorporated herein by reference in its entirety.

FIELD OF THE INVENTION

This invention relates generally to illuminated display devices and, more particularly, to a menu board device for use with drive-through establishments where orders are taken, such as a quick service restaurant.

BACKGROUND OF THE INVENTION

Illuminated display devices are commonly used by businesses such as restaurants for presenting marketing, advertisement, and promotional materials to their customers. In particular, quick-service restaurants (QSR) equipped with drive-through service lanes may use illuminated display devices, such as one or more outdoor digital menu boards, which are typically positioned adjacent to pathways leading to the restaurant or along drive-through service lanes. A menu board for a drive-through often includes multiple display screens and an ordering system with a speaker/microphone, and is usually located proximate the physical building for ordering. For a QSR, it is common practice to locate a menu board between the drive-through service lane and the physical building so that a customer using the drive-through lane may interact with an employee of the restaurant via the menu board to place an order and also then pick up the order at another location at the building.

Due to location, cost, or a desire to reduce operational expenses in highly competitive and costly markets, the layout of a conventional QSR is compact to efficiently provide space for dining, parking, and drive-through operations. To maximize usable space, particularly for drive-through lanes, the positioning of each menu board becomes an important consideration, especially given their large size. A typical outdoor menu board may have up to three or more digital screens and related components for placing orders, spanning five or more feet wide and weigh well over a thousand pounds. Thus, one desirable way to maximize usable space is to position at least one menu board proximate to the physical building, and in many cases flush with the building, as described above. However, other space-saving installation locations include installing menu boards adjacent to retaining walls, landscaping, or other permanent structures.

The desire to install menu boards in space-limited locations, as described above, results in limited space in which to assemble, install, and perform follow up service work on their menu boards. Because the typical outdoor digital menu board is a static installation, follow up service work such as routine maintenance, part replacement, or other related electrical or mechanical work on the menu board can be particularly difficult.

Accordingly, it is desirable to improve upon existing illuminated display devices, such as an outdoor digital menu board, for more efficient installation and follow up servicing, particularly for menu boards installed in areas with limited space.

SUMMARY OF THE INVENTION

The present invention overcomes the foregoing and other shortcomings and drawbacks of illuminated display devices, particularly those used as menu boards. While the invention will be described herein in connection with certain embodiments, it will be understood that the invention is not limited to these embodiments. On the contrary, the invention includes all alternatives, modifications, and equivalents as may be included within the spirit and scope of the invention.

According to one embodiment of the present invention, an illuminated display device is provided. The illuminated display device includes a hinge post, a support post positioned in a laterally spaced relationship to the hinge post, and at least one of an upper support arm or lower support arm being pivotably coupled to the hinge post and movable between a first position and a second position. In this regard, the at least one support arm engages with the support post when moved to the first position. The illuminated display device further includes a display assembly supported by the at least one of the upper support arm or lower support arm, the display assembly configured to support at least one display screen.

According to one aspect of the present invention, the illuminated display device includes both the upper support arm and the lower support arm with the display assembly supported between the upper support arm and lower support arm in an upright position. According to another aspect, the display assembly includes at least one display screen. According to yet another aspect, the illuminated display device includes a control cabinet mounted to the lower support arm. According to one aspect, the illuminated display device includes a speakerphone assembly mounted to one of the upper support arm or lower support arm or hinge post.

According to one aspect of the present invention, the at least one support arm of the illuminated display device is releasably coupled to the support post when moved to the first position. According to another aspect, the display assembly is pivotable between the first position with the at least one support arm coupled to the support post and the second position with the at least one support arm uncoupled from the support post. According to yet another aspect, the illuminated display device includes a stop mounted to the hinge post and configured to abut the at least one support arm.

According to one aspect of the present invention, the at least one support arm is releasably coupled to the support post with a locking mechanism. According to another aspect, the at least one support arm is pivotably coupled to the hinge post with a bracket and a support assembly. According to a further aspect, the bracket and support assembly define a pivot joint and a vertical pivot axis for the at least one support arm. In yet another aspect, the pivot axis is offset from the hinge post.

According to another aspect of the present invention, the illuminated display device includes a shroud mounted to the at least one support arm. In another aspect, the shroud partially encloses the support post when in the first position. In yet another aspect, the at least one support arm is releasably coupled to the support post with a locking mechanism, and the shroud includes a notch configured to receive part of the locking mechanism therein. In one aspect, the support post includes a support bracket configured to support the at least one support arm when in the first position. In another aspect, the support bracket is vertically adjustable along a length of the support post.

According to another embodiment of the present invention, a method for servicing an illuminated display device installed adjacent a permanent structure is provided. The illuminated display device includes a hinge post, a support post positioned in a laterally spaced relationship to the hinge post, and at least one support arm pivotably coupled to the hinge post and movable between a first position and an second position. The at least one support arm engages with the support post when moved to the first position. The illuminated display device further includes a display assembly supported by the at least one support arm, the display assembly configured to support at least one display screen. The method includes disengaging the at least one support arm from the support post and pivoting the display assembly about the hinge post in a direction away from the permanent structure. The method further includes servicing the illuminated display device, pivoting the display assembly about the hinge post in a direction towards the permanent structure, and engaging the at least one support arm and support post.

According to one aspect of the invention, the illuminated display device further includes a shroud mounted to the at least one support arm and a support bracket adjustably mounted to the support post. The step of disengaging the at least one support arm from the support post further includes loosening the support bracket and sliding the support bracket in a downward direction along the support post and out of the way of the shroud.

According to another aspect, the step of engaging the at least one support arm to the support post further includes sliding the support bracket in an upward direction along the support post to position the support bracket adjacent to the at least one support arm and fixing the support bracket in place to the support post.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION OF THE INVENTION

With reference to FIGS. 1 through 5, an exemplary illuminated display device is shown as being an outdoor digital menu board according to one embodiment of the present invention. While the invention will be described herein in connection with an outdoor digital menu board, it will be understood that the invention is not limited to this embodiment. Rather, the principles of the invention described herein, in its broader aspects, are applicable to outdoor or indoor illuminated display devices generally.

Figure 1:
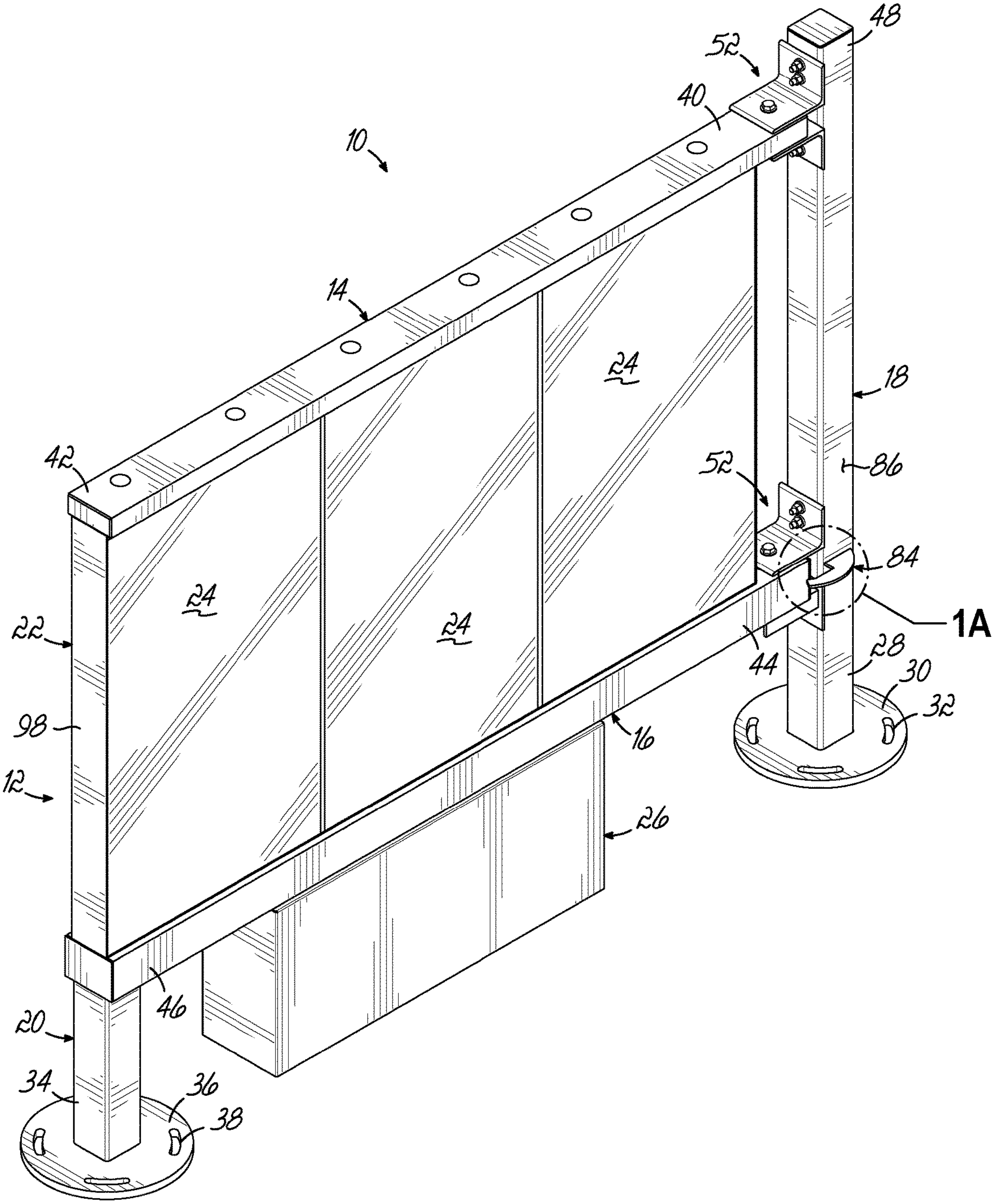
FIG. 1 is a perspective view of a front side of an outdoor digital menu board shown in a first, latched position, according to an exemplary embodiment of the invention.
Figure 2:
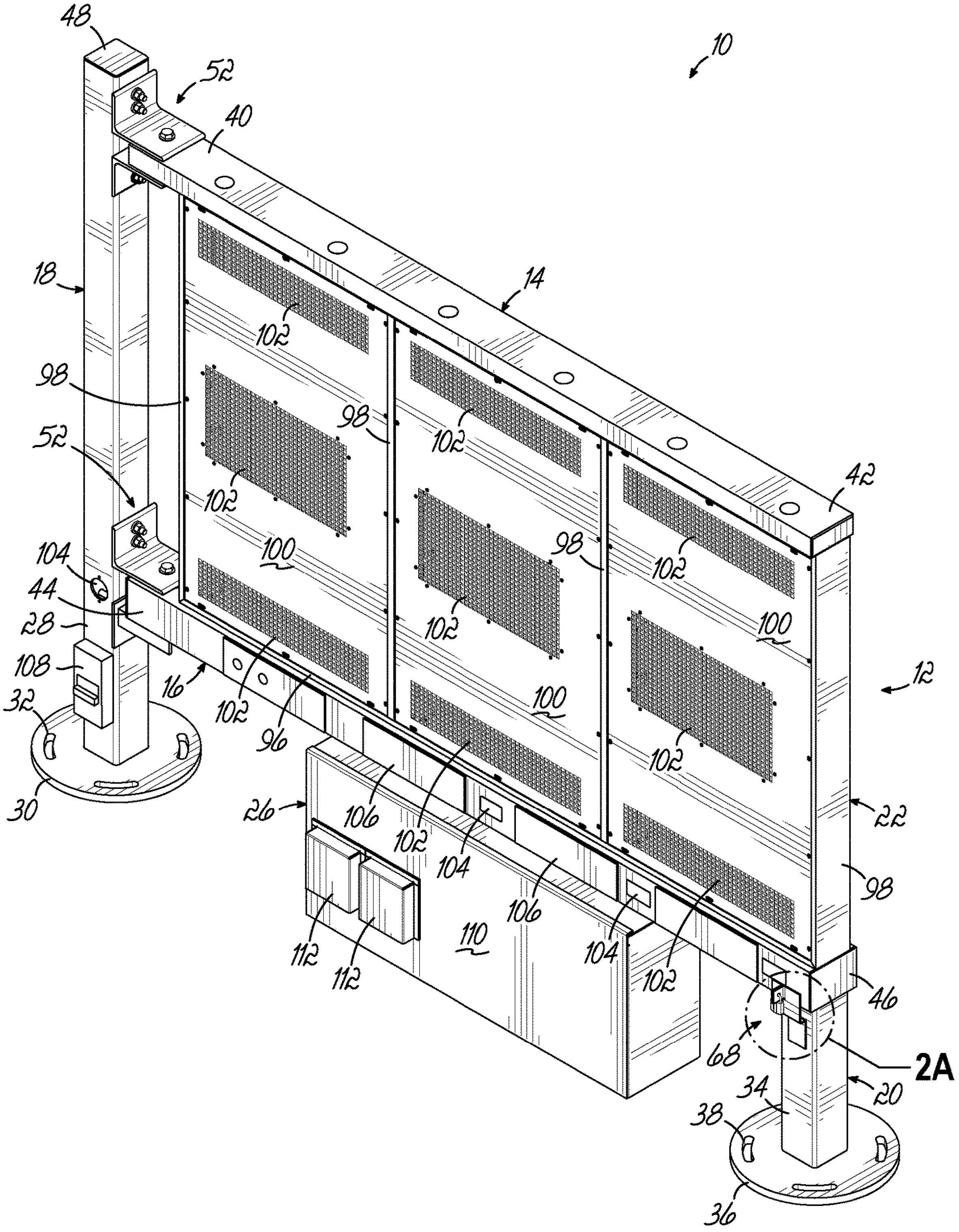
FIG. 2 is a perspective view of a rear side of the exemplary menu board shown in FIG. 1.

With reference now to FIGS. 1 and 2, an outdoor digital menu board 10 according to one embodiment of the present invention is illustrated incorporating various aspects for providing more efficient installation and follow up servicing of the menu board 10, which may be installed in an area with limited space such as at a QSR or "fast food" restaurant, for example. The exemplary menu board 10 includes a display assembly 12 supported above the ground by an upper support arm 14 and a lower support arm 16, with at least the lower support arm 16 extending between a hinge post 18 and a support post 20. In one embodiment, the display assembly 12 includes a frame 22 configured to support one or more display screens 24. As shown, the display assembly 12 is supported in an upright position between the upper support arm 14 and lower support arm 16 which are pivotably coupled at one end to the hinge post 18 and extend generally parallel to each other throughout pivotal movement of the display assembly 12 as will be described in greater detail below. This pivotal arrangement of the upper support arm 14 and lower support arm 16 relative to the hinge post 18 permits articulating or pivoting movement of the display assembly 12 about the hinge post 18, as described in greater detail below. In the embodiment shown, the menu board 10 further includes a control cabinet 26 mounted to the lower support arm 16.

In one embodiment, the hinge post 18, support post 20, upper support arm 14, and lower support arm 16 are preferably all formed from extruded metal tubing. In the embodiment shown, the extruded metal tubing used for the hinge post 18, support post 20, upper support arm 14, and lower support arm 16 has a square or rectangular cross-sectional shape. However, other polygonal or round cross-sectional shapes may be used and are within the scope of the invention. To this end, the extruded metal tubing may be formed from any one of aluminum, titanium, or any type of steel, for example, but is not limited thereto.

Typically, outdoor digital menu boards are permanent fixtures due to their heavy weight and large size. Consequently, the hinge post 18 and support post 20 are configured to be mounted securely to the ground, if desired. In this regard, as best shown in FIG. 1, a base 28 of the hinge post 18 includes a mounting flange 30 for mounting to a permanent structure embedded in the ground such as a concrete slab, concrete post, or other similar structure. The mounting flange 30 may have one or more apertures 32 for bolting, screwing, anchoring, or otherwise fixing the hinge post 18 to the ground. Similarly, a base 34 of the support post 20 also includes a mounting flange 36. As shown, the support post 20 mounting flange 36 may also include one or more apertures 38 for fixing the support post 20 to a concrete or other type of permanent structure embedded in the ground. The flanges 30, 36 may be any polygonal shape, such as square, or alternatively, may be circular in shape having rounded edges as shown. Further, the flanges 30, 36 may be similarly shaped or have different shapes to accommodate for different mounting surfaces, for example. As will become more clear below, the hinge post 18 and support post 20 are fixed to the ground a distance apart which corresponds generally to a length of the display assembly 12 and, more particularly, a length of the upper and lower support arms 14, 16, respectively.

Figure 3:
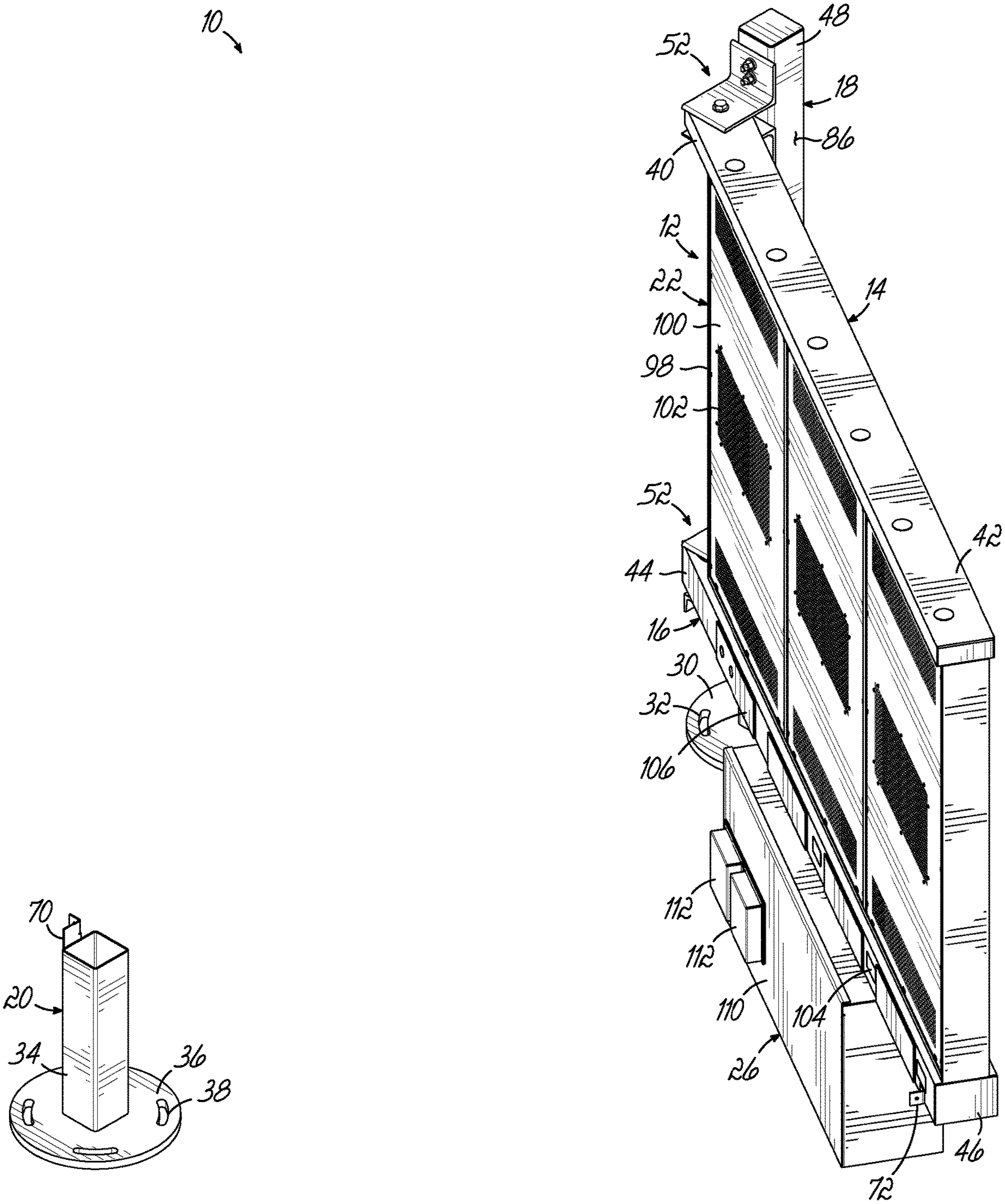
FIG. 3 is a perspective view of the menu board shown in FIGS. 1, 2 and 2B, showing the menu board in a second, unlatched position.

Referring to FIGS. 1 and 2, the upper and lower support arms 14, 16 are pivotably coupled to the hinge post 18 at one respective common end. More particularly, the upper support arm 14 is pivotably coupled to the hinge post 18 at a proximal end 40 and extends from the hinge post 18 a length to a distal end 42. Similarly, the lower support arm 16 is pivotably coupled to the hinge post 18 at a proximal end 44 and extends a length from the hinge post 18 to a distal end 46. As shown, the upper and lower support arms 14, 16 are supported in a cantilever arrangement by the hinge post 18 and are spaced apart along a length of the hinge post 18 at the respective common proximal ends 40, 44. The lower support arm 16 is pivotally supported proximate to the base 28 of the hinge post 18 and the upper support arm 14 is pivotally supported proximate to a top 48 of the hinge post 18. The spacing of the upper and lower support arms 14, 16 along the hinge post 18 generally corresponds to a height of the display assembly 12 which is mounted between the upper and lower support arms 14, 16. To this end, as best shown in FIG. 1, when the menu board 10 is in a first, latched position, with the lower support arm 16 engaged with the support post 20, the weight of the display assembly 12 may be distributed between the hinge post 18 and support post 20. To this end, the engagement between the lower support arm 16 and the support post 20 may be one where the lower support arm 16 is coupled to the support post 20, as described in additional detail below. Alternatively, the lower support arm 16 may "float" above the support post 20 when in the first, latched position. In either case, when the display assembly 12 is in a second, unlatched position, with the display assembly 12 pivoted away from the support post 20, as best shown in FIG. 3, the hinge post 18 supports the entire weight of the display assembly 12.

Figure 2A:
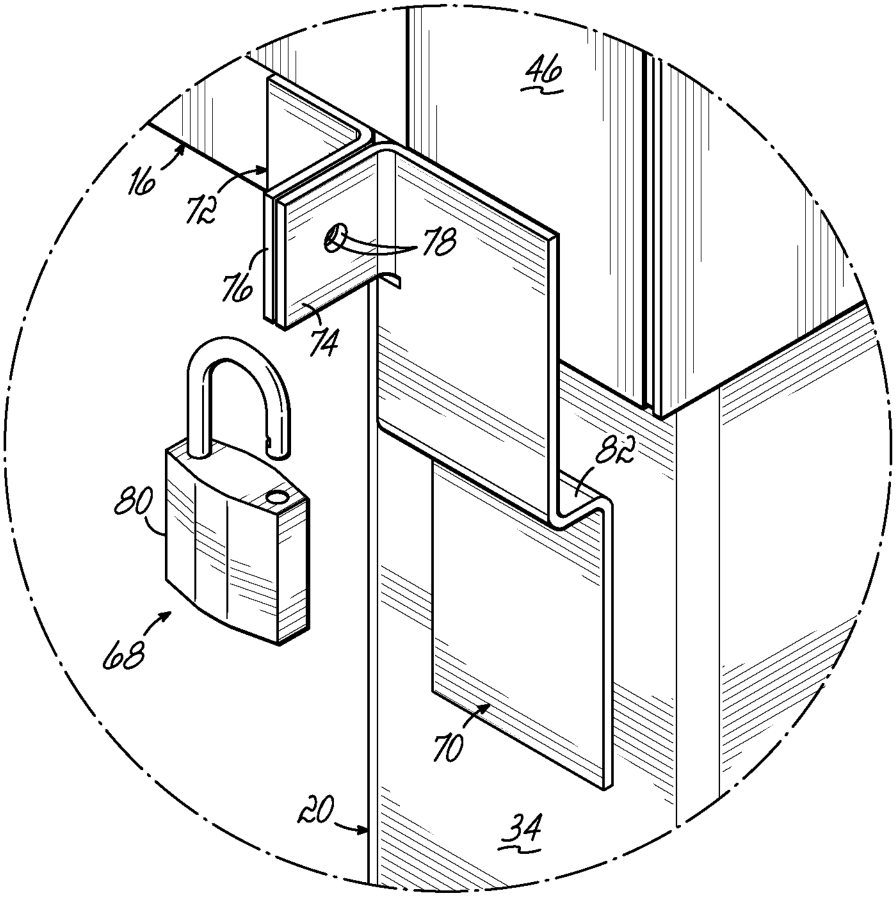
FIG. 2A is an enlarged view of a locking mechanism according to an exemplary embodiment of the invention.
Figure 2B:
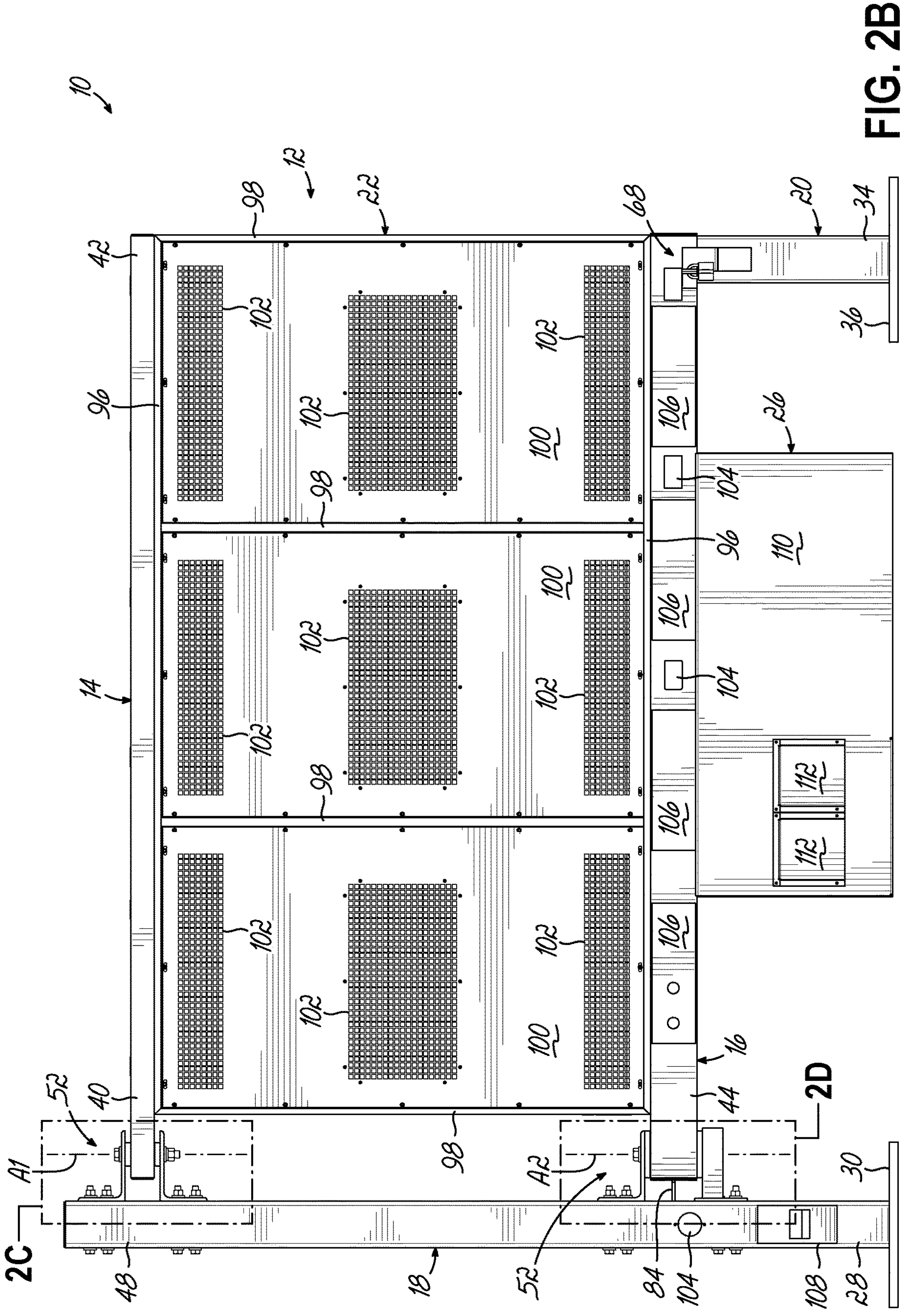
FIG. 2B is a rear view of the menu board shown in FIGS. 1 and 2.
Figure 2D:
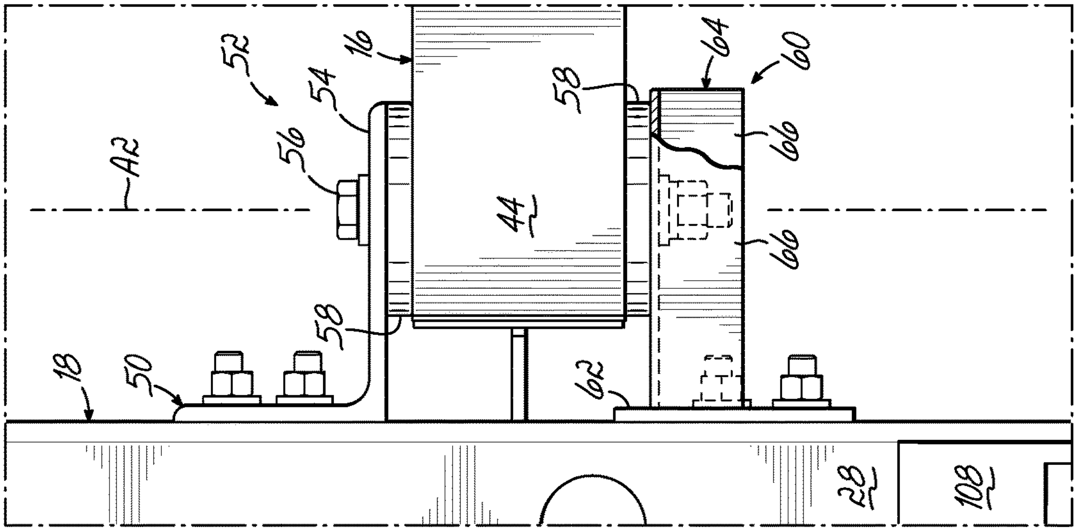
FIG. 2D is an enlarged view of a hinge joint for the lower support arm according to an exemplary embodiment of the invention.
Figure 2C:
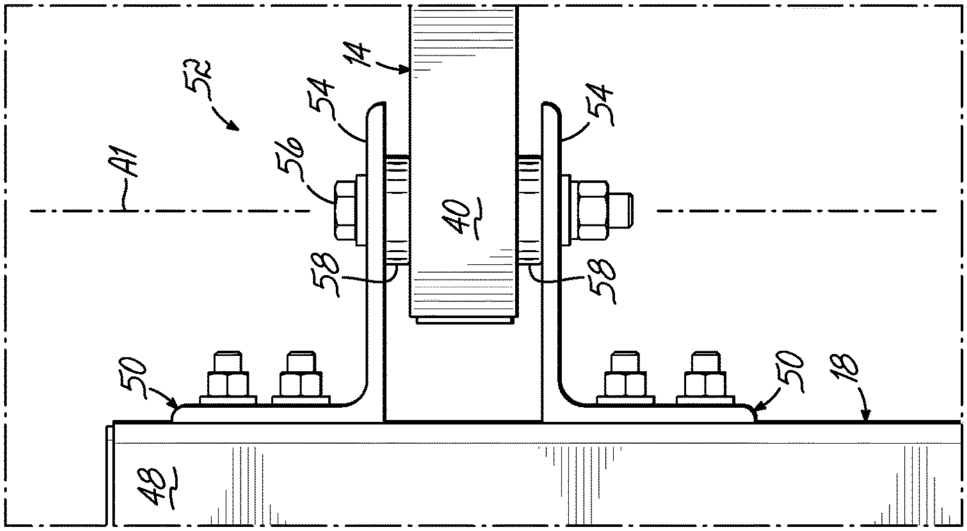
FIG. 2C is an enlarged view of a hinge joint for the upper support arm according to an exemplary embodiment of the invention.

With reference to FIGS. 2, 2B, and 2C, the proximal end 40, 44 of the respective upper and lower support arms 14, 16 are each pivotably attached to the hinge post 18 with at least one bracket 50 to define a pivot joint 52 for each of the upper and lower support arms 14, 16. In this regard, the pivot joint 52 of the upper support arm 14 has a pivot axis A1 and the pivot joint of the lower support arm 16 has a pivot axis A2. In the embodiment shown, the pivot axis A1 for the upper support arm 14 and the pivot axis A2 for the lower support arm 16 are axially aligned.

As shown in FIG. 2C, the upper support arm 14 is pivotably coupled to the hinge post 18 with a pair of brackets 50. In one embodiment, the brackets 50 are L-shaped with a tab 54 configured to attach to the support arm 14. The pair of brackets 50 are mounted to the hinge post 18, proximate to the top 48, with a nut and bolt combination, a screw, anchor, or other suitable structure. As shown, the brackets 50 are mounted to the hinge post 18 in a spaced apart configuration such that the tabs 54 are spaced a distance apart, along the hinge post 18, to closely receive the proximal end 40 of the upper support arm 14 therebetween. The proximal end 40 of the upper support arm 14 is pivotably coupled between the pair of brackets 50 with a bolt 56, nut and bolt combination, pin, or other suitable structure. The bolt 56 extends through the tabs 54 of the pair of brackets 50 and proximal end 40 of the upper support arm 14 and defines the vertical pivot axis A1 for the upper support arm 14. The pivot joint 52 for the upper support arm 14 may include two bearings 58, with one bearing 58 positioned between the upper support arm 14 and first bracket 50 tab 54 and another bearing 58 positioned between the upper support arm 14 and second bracket 50 tab 54.

As shown in FIG. 2D, the proximal end 44 of the lower support arm 16 may be pivotably mounted to the hinge post 18 with one L-shaped bracket 50 and a bracket assembly 60. The bracket assembly 60 is mounted to the hinge post 18 at a location underneath the proximal end 44 of the lower support arm 16. As a result of this positioning, the bracket assembly 60 is exposed to greater loads generated by the weight of the display assembly 12 compared to other brackets 50, especially when the display assembly 12 is being pivoted. In that regard, the bracket assembly 60 includes a plate 62 configured to be mounted to the hinge post 18 and a support member 64 configured to be fixed to the plate 62 in a perpendicular arrangement. The plate 62 may be mounted to the hinge post 18 using a nut and bolt combination, a screw, anchor, or other suitable securing structure. The support member 64 may be fixed to the plate 62 by welding or other similar means. As shown, the support member 64 is generally perpendicular to the plate 62 and extends a distance from the plate 62 and includes a flat surface for receiving the proximal end 44 of the lower support arm 16. In the embodiment shown, the support member 64 may have a width that generally corresponds to the width of the lower support arm 16. Furthermore, the support member 64 may be similarly sized to the bracket 50 tab 54. To provide for increased load bearing support, the support member 64 may be generally U-shaped, having sidewalls 66 that extend from the support member 64 in a downward direction along the plate 62 (e.g., in a direction towards the base 28 of the hinge post 18). Thus, the U-shaped configuration of the support member 64 not only provides for additional contact surface area with the plate 62 for mounting thereto, but also provides for increased structural support to withstand the loads generated by the weight of the display assembly 12 on the bracket assembly 60.

With continued reference to FIG. 2D, the plate 62 of the bracket assembly 60 is mounted to the hinge post 18 proximate to the base 28, with the support member 64 attached to the plate 62 and extending generally perpendicularly therefrom. The bracket 50 is mounted to the hinge post 18 and spaced apart a distance from the bracket assembly 60, in a direction towards the top 48 of the hinge post 18. In this regard, the tab 54 and support member 64 are spaced apart to closely receive the proximal end 44 of the lower support arm 16 therebetween. The proximal end 44 of the lower support arm 16 is pivotably coupled between the tab 54 and support member 64 with a bolt 56, nut and bolt combination, pin, or other suitable structure. The bolt 56 extends through the bracket 50 tab 54, proximal end 44 of the lower support arm 16, and support member 64, and defines the vertical pivot axis A2 for the lower support arm 16. As best shown in FIG. 2B, the pivot joint 52 for the lower support arm 16 may include two bearings 58, with one bearing 58 positioned between the lower support arm 16 and tab 54 and another bearing 58 positioned between the lower support arm 16 and support member 64. To this end, the bearings 58 may all be similarly sized or, alternatively, some bearings 58 may be larger compared to other bearings 58. For example, the bearings 58 between the lower support arm 16, tab 54, and support member 64 may be larger compared to the bearings 58 between the upper support arm 14 and the pair of bracket 50 tabs 54. In any case, the bearings 58 reduce rubbing and wear on the upper and lower support arms 14, 16 and improve the pivotability of the display assembly 12.

With reference to FIGS. 1 through 2D, the spacing of the bracket 50 and bracket assembly 60 along the hinge post 18 may be different compared to the spacing of the brackets 50 for the upper support arm 14 as a result of the upper and lower support arms 14, 16 being sized differently. In the embodiment shown, the lower support arm 16 has a larger cross-sectional size compared to the upper support arm 14. The larger cross-sectional size of the lower support arm 16 is to accommodate mounting of both the display assembly 12 and control cabinet 26 thereto, as well as the weight of those components. However, in an alternative embodiment, the cross-sectional sizes of the upper and lower support arms 14, 16 may be the same. Or, in another embodiment, the upper support arm 14 may have a cross-sectional size greater than that of the lower support arm 16.

With respect to the attachment of the upper and lower support arms 14, 16 to the hinge post 18, it will be understood that the invention is not limited to using L-shaped brackets 50 to pivotably couple the upper and lower support arms 14, 16 to the hinge post 18, and other structures are within the scope of the invention such as bolt on or weld on hinges, pivot hinges, pivot brackets having different shapes or configurations, or other similar means.

With reference to FIGS. 1, 2, and 2B, the menu board 10 is shown in the first, latched position with the lower support arm 16 engaged with the support post 20. In the embodiment shown, the lower support arm 16 is positioned over the support post 20 and removably coupled thereto via a locking mechanism 68. As best shown in FIG. 2A, the locking mechanism 68 includes a first bracket 70 mounted to the support post 20 and a second bracket 72 mounted to the distal end 46 of the lower support arm 16. The first and second brackets 70, 72 further include respective locking tabs 74, 76 with corresponding apertures 78 therethrough. In this regard, the first and second brackets 70, 72 are mounted to the lower support arm 16 and support post 20 such that when the lower support arm 16 is positioned over the support post 20, the locking tabs 74, 76, and more particularly the apertures 78, align adjacently so that the shank of a padlock 80 or other similar locking structure may be inserted through the aligned apertures 78 to thereby couple the display assembly 12 to the support post 20. Alternatively, a locking pin such as a clevis pin, wire lock pin, cotterless hitch pin, or other similar locking device may be used without departing from the scope of the present invention. In the embodiment shown, the first bracket 70 may have a bent portion 82 to accommodate for the large cross-sectional size of the lower support arm 16 so that, when coupled together, the lower support arm 16 is centered over the support post 20.

In the exemplary embodiment shown, the lower support arm 16 is positioned over the support post 20 and releasably coupled thereto via the locking mechanism 68. However, other engagement configurations between the display assembly 12 or lower support arm 16 and the support post 20 are contemplated as being within the scope of the invention. For example, in one alternative embodiment, the lower support arm 16 may be positioned adjacent to a side of the support post 20 and releasably coupled to the side of the support post 20 with a locking mechanism. The locking mechanism of this embodiment may include one or two brackets and a padlock or locking pin, for example.

Referring now to FIG. 3, once the padlock 80 is removed from the first and second brackets 70, 72, the lower support arm 16 may be disengaged from the support post 20 and the display assembly 12 pivoted about the hinge post 18, and more particularly, about the pivot axes A1, A2, to the second, unlatched position. When so positioned, the rear side of the display assembly 12 and menu board 10 may be accessed for maintenance work or other purposes. As shown in FIG. 1, to limit pivotal movement of the display assembly 12, the menu board 10 further includes a stop 84. In this regard, the stop 84 is configured to abut the lower support arm 16 at a certain pivotal position about the pivot axis A2 to thereby limit movement of the display assembly 12.

Figure 1A:
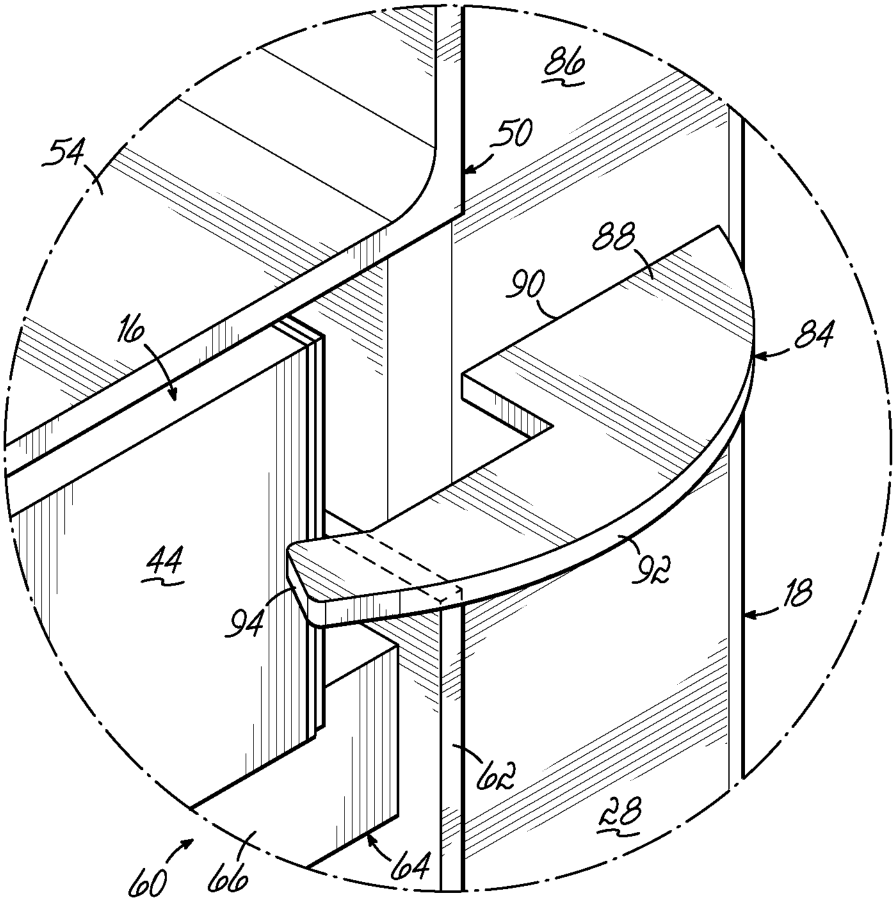
FIG. 1A is an enlarged view of a stop according to an exemplary embodiment of the invention.

As best shown in FIG. 1, the stop 84 is mounted to a front-facing surface 86 of the hinge-post. More particularly, the stop 84 is mounted to the hinge post 18 adjacent to the lower support arm 16. With reference to FIG. 1A, the stop 84 has a plate-like body 88 having a thickness which may be anywhere between ⅛ of an inch to 1 inch thick or greater, for example. The body 88 of the stop 84 includes a mounting surface 90 configured to be attached to the hinge post 18 such as by welding or other similar means, and an extension 92. The extension 92 includes an edge 94 configured to abut a portion of the proximal end 44 of the lower support arm 16 once the support arm 16 reaches a desired pivotal position. In this regard, the edge 94 may be angled outwardly from the lower support arm 16 when coupled to the support post 20. The edge 94 may be angled between 20 to 80 degrees relative to the latched lower support arm 16, or between 45 to 60 degrees, for example. In one embodiment the edge may be angled 60 degrees. This way, when the display assembly 12 is pivoted 30 degrees from the latched position, for example, the edge 94 and the lower support arm 16 abut along the edge 94 in an even or level manner. To this end, the menu board 10 may include a second stop located on the hinge post 18 adjacent to the upper support arm 14, for example. Thus, the menu board 10 may have one stop 84 adjacent to either the upper support arm 14 or lower support arm 16, or one stop adjacent to both support arms 14, 16, for example.

Referring to FIGS. 1, 2, and 2B, the frame 22 of the exemplary display assembly 12 is mounted to the upper and lower support arms 14, 16 and configured to receive at least one or, alternatively, a plurality of display screens 24 therein. In this regard, according to one embodiment, the frame 22 includes two horizontal members 96 and a plurality of vertical members 98 attached to and extending between the two horizontal members 96. As shown, one horizontal member 96 is attached to the upper support arm 14 and another horizontal member 96 is attached to the lower support arm 16. Each horizontal member 96 extends along the corresponding upper and lower support arms 14, 16 and generally from the respective proximal end 40, 44 to the respective distal end 42, 46. The vertical members 98 are mounted to the horizontal members 96 and extend therebetween. The vertical members 98 generally correspond to a height of the display assembly 12 which is sized to be received between the upper and lower support arms 14, 16, as shown. The frame 22 is configured to surround the plurality of display screens 24. In this regard, the horizontal and vertical members 96, 98 provide for structural support as well as an appropriate mounting surface for one or more of the display screens 24. To this end, the frame 22 may have a width that is less than a width of the upper and lower support arms 14, 16, for example. The frame 22 may be mounted to the upper and lower support arms 14, 16 using a nut and bolt combination, a screw, or other suitable securing means.

In the exemplary embodiment, the plurality of display screens 24 are mounted to the frame 22 to face outwardly on a front-facing side of the menu board 10 (e.g., the side of the menu board 10 that faces the drive-through lane or customer ordering point), and display various food menu items that might be ordered, as well as related information (prices, combos, deals, etc.), for example. Those skilled in the art will easily understand that the plurality of display screens 24 may be implemented as an analog TV, a digital TV, a 3D TV, a smart TV, an LED TV, an OLED TV, a plasma TV, a monitor, a curved TV having a screen with a fixed curvature, a flexible TV having a screen with a fixed curvature, a bent TV having a screen with a fixed curvature, and/or a variable curvature TV in which the curvature of a current screen can be changed by an input received from the user, or other similar means, but is not limited thereto.

With reference to FIGS. 1, 2, and 2B, each display screen 24 is recessed within the confines of the frame 22 and mounted thereto. More particularly, each display screen 24 may be mounted to the horizontal and vertical members 96, 98 of the frame 22. Additionally or alternatively, part of the frame 22 may be configured to overlay a portion of each display screen 24 to retain each of the plurality of display screens 24 within the frame 22. In either case, the plurality of display screens 24 are installed in the frame 22 with the screens facing outwardly on a front-facing side of the menu board 10 (e.g., the side of the menu board 10 facing a customer in a drive-through lane). Each display screen may be mounted to the frame 22 using a nut and bolt combination, a screw, anchor, or other suitable securing structure. As best shown in FIG. 2, to provide access to the electrical components of the plurality of display screens 24, the display assembly 12 may include one or more access panels 100 mounted to the frame 22 on the rear side of the menu board 10. The display assembly 12 may include one access panel 100 for each display screen 24, for example. However, fewer or more access panels 100 may be used as desired. Each access panel 100 may be removably attached to corresponding horizontal and vertical members 96, 98 of the frame 22, and may further include one or more air intakes or vents 102 for cooling of the one or more display screens 24, for example.

With continued reference to FIGS. 1, 3, and 2B, the plurality of display screens 24 are connected, in a wireless or wired mode, with appropriate control electronics located in the control cabinet 26 for providing and controlling the content of the plurality of display screens 24. As shown, the control cabinet 26 may be mounted to an underside of the lower support arm 16 and suspended a distance above the ground. The control cabinet 26 may be mounted to the lower support arm 16 using a nut and bolt combination, a screw, anchor, or other suitable securing structure. In any event, the control cabinet 26 may include a commercially available speaker/microphone unit or system and media player, as would be understood by a person of ordinary skill in the art, so that a customer may interact with an employee of the QSR via the menu board 10 to place an order. To carry out ordering operations and to control the content displayed on the plurality of display devices, the control cabinet 26 may include electronic devices such as a control unit, a processor, a communication unit, an input/output device, a memory storage device, and a power unit, as well as other devices as would be understood by a person of ordinary skill in the art.

To accommodate for electrical or mechanical connections, the hinge post 18, upper support, lower support, and/or support post 20 may include one or more openings 104 with some having a removable cover panel 106, for example. Furthermore, a power switch 108 may be located on the hinge post 18 to power on or off the connected electronics of the menu board 10. In the exemplary embodiment, the power switch 108 is located on a rear side of the hinge post 18. However, other locations of the power switch 108 are possible, such as on the front-facing surface 86 of the hinge post 18 or cabinet 26, for example. As best shown in FIG. 2, to provide access to the electronics stored therein, the control cabinet 26 includes a removable main access door 110 that includes one or more cooling fans 112 to cool the electronics stored in the cabinet 26.

Figure 4:
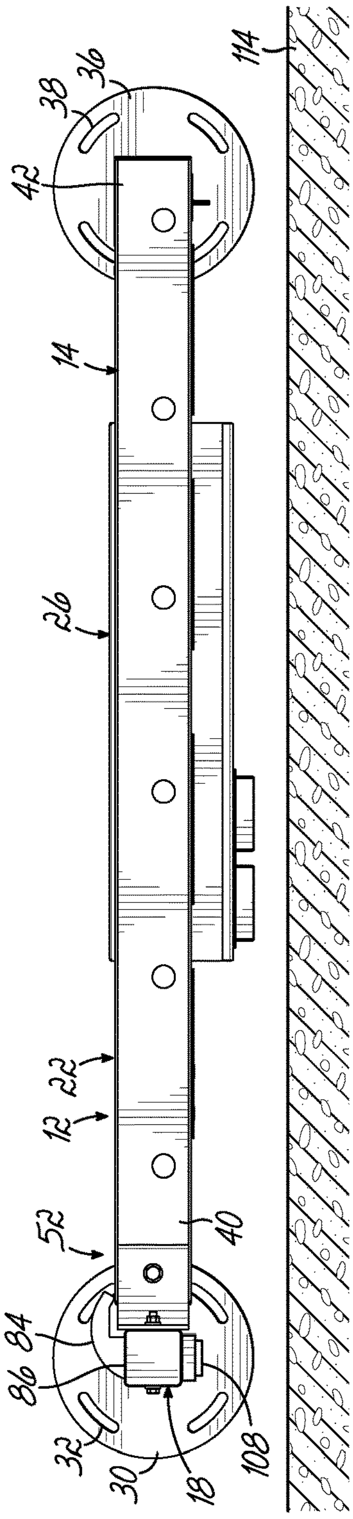
FIG. 4 is a top view of the outdoor digital menu board shown in FIGS. 1, 2, 2B, and 3, showing the menu board installed adjacent to a permanent structure and in the latched position according to one embodiment of the present invention.
Figure 5:
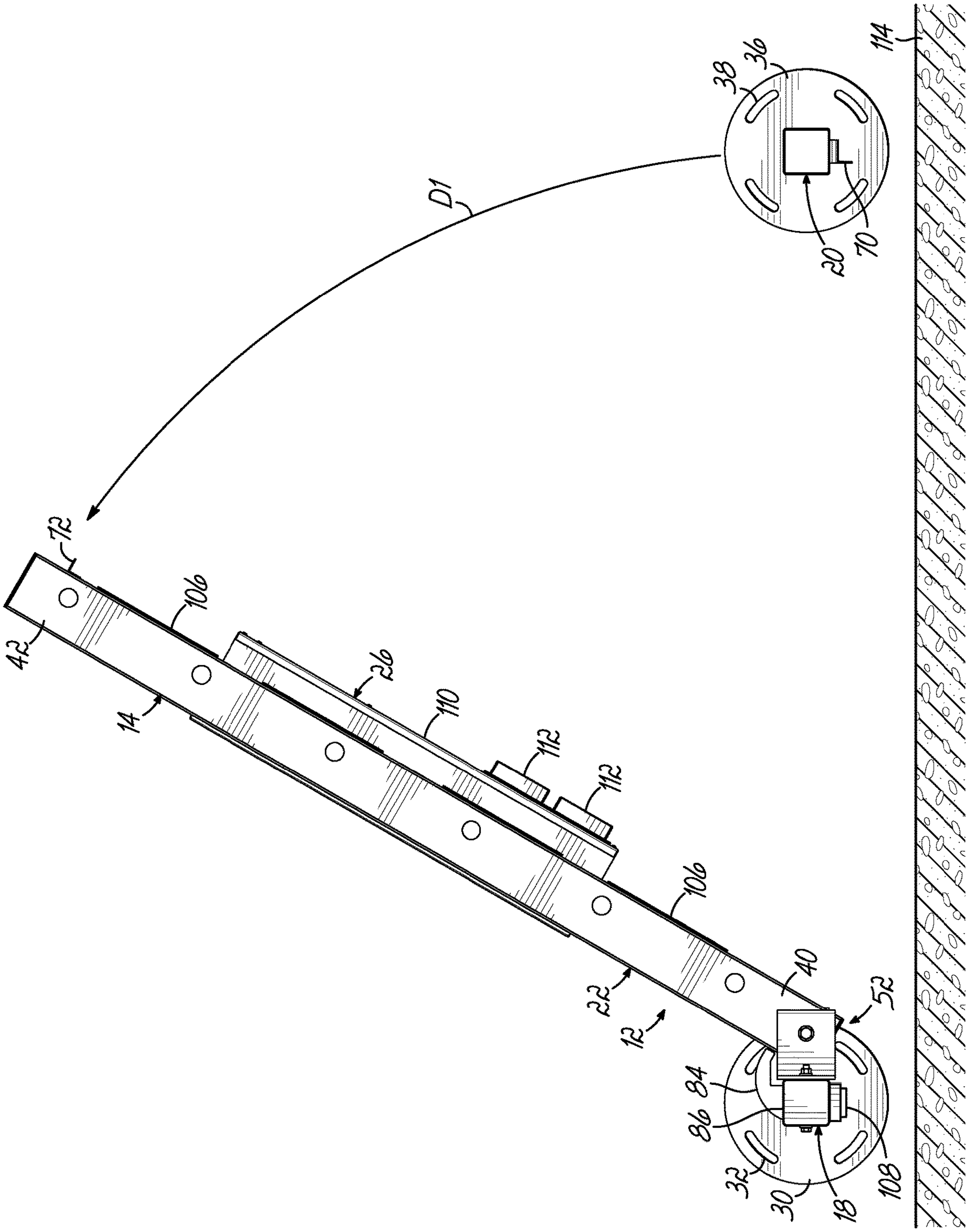
FIG. 5 is a top view of the menu board shown in FIG. 4, showing the menu board in an unlatched position.

As shown, access to both the control cabinet 26 and to the plurality of display screens 24 is located on the rear side of the menu board 10. That way, the front of the menu board 10 remains appealing from the viewpoint of a customer who can focus on the content of the display screens 24 for placing an order. However, as is often the case, the menu board 10 is installed proximate to a permanent structure 114, as shown in FIG. 4, and access to the rear of the menu board 10 for maintenance work may be difficult or impossible as a result. In this regard, an exemplary method for accessing the rear side of the menu board 10 for maintenance work or other purposes will now be described.

As shown in FIG. 4, the menu board 10 is adjacent the permanent structure 114 and in the first, latched position, so that the display screens 24 may be viewed by a customer from a drive-through lane for placing an order, for example. To service the menu board 10, a technician must first disengage the display assembly 12, and more particularly the lower support arm 16 from the support post 20. This step may further involve decoupling the lower support 16 from the support post 20 by removing the padlock 80. Once disengaged, the technician then pivots the display assembly 12 away from the permanent structure 114 as indicated by arrow D1 shown in FIG. 5. The technician may pivot the display assembly 12 to the second, unlatched position, where upper and lower supports abut the stops 84. Alternatively, the technician may pivot the display assembly 12 to an intermediate position between the first, latched position, and the second, unlatched position, if desired. When so positioned, the technician may access the rear of the display assembly 12 to perform the desired service work. Once the service work is complete, the technician then pivots the display assembly 12 in a direction towards the support post 20 until the lower support arm 16 engages with the support post 20. This step may further include aligning the brackets 70, 72, of the locking mechanism 68 so that the shank of the padlock 80 may be passed through the aligned apertures 78. At which point the technician locks the padlock 80 to secure the menu board 10 in the latched position for further operational use.

Figure 6:
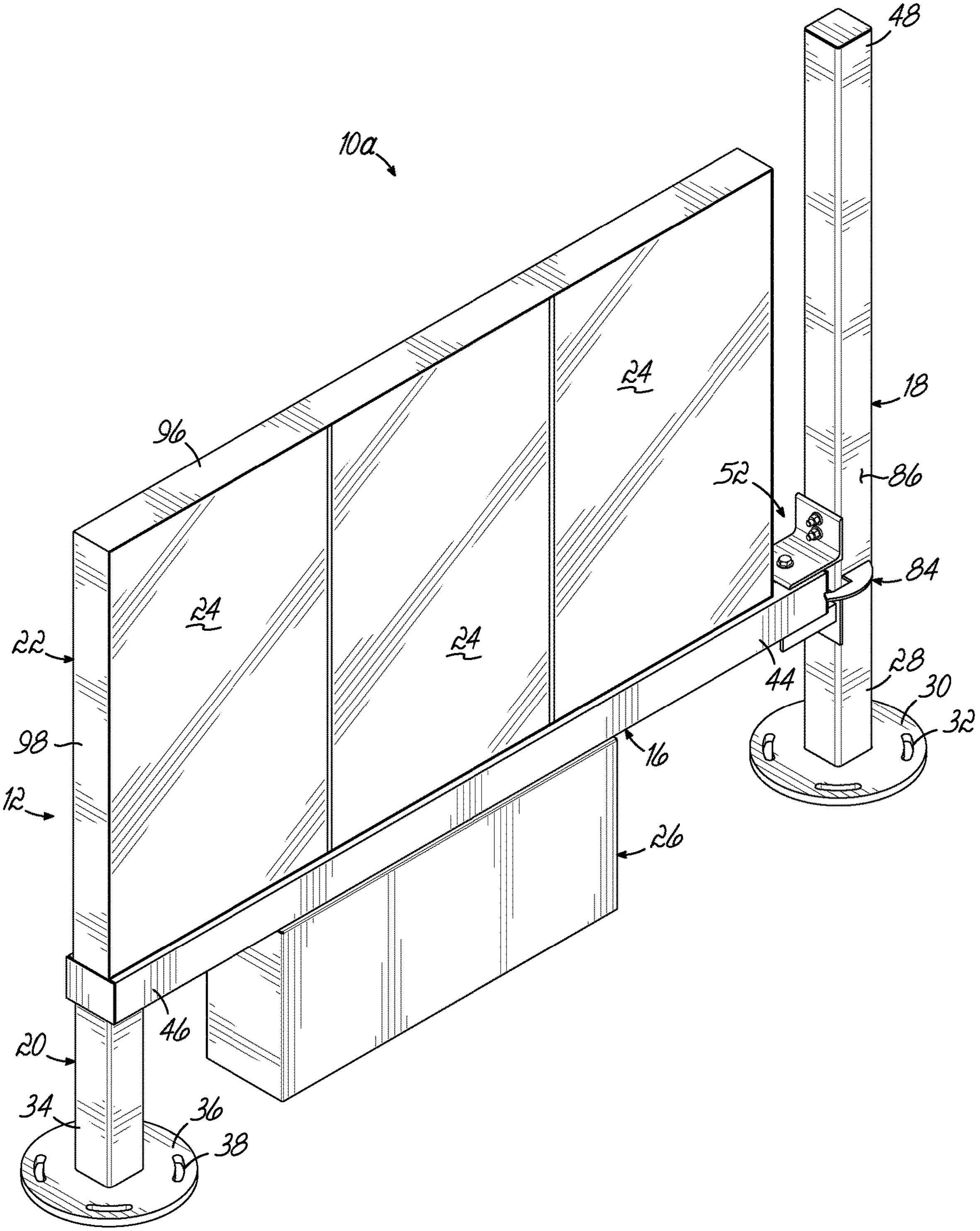
FIG. 6 is a perspective view of a front side of an outdoor digital menu board according to another embodiment of the invention.

Referring now to FIG. 6, wherein like numerals represent like features, an exemplary outdoor digital menu board 10*a* is shown in accordance with another embodiment of the present invention. The primary differences between the menu board 10*a* of this embodiment and the menu board 10 of the previously described embodiment is that the menu board 10*a* includes a lower support arm 16 but not an upper support arm 14. As shown, the display assembly 22 is pivotably supported in an upright position by the lower support arm 16. Similar to the embodiment described above with regard to FIGS. 1-5, the display assembly 22 is pivotable between a first, latched position, where the lower support arm 16 is engaged with the support post 20, and a second, unlatched position, where the lower support arm 16 is disengaged from the support post 20. To this end, the engagement between the lower support arm 16 and the support post 20 may be one where the lower support arm 16 is coupled to the support post 20.

Figure 7:
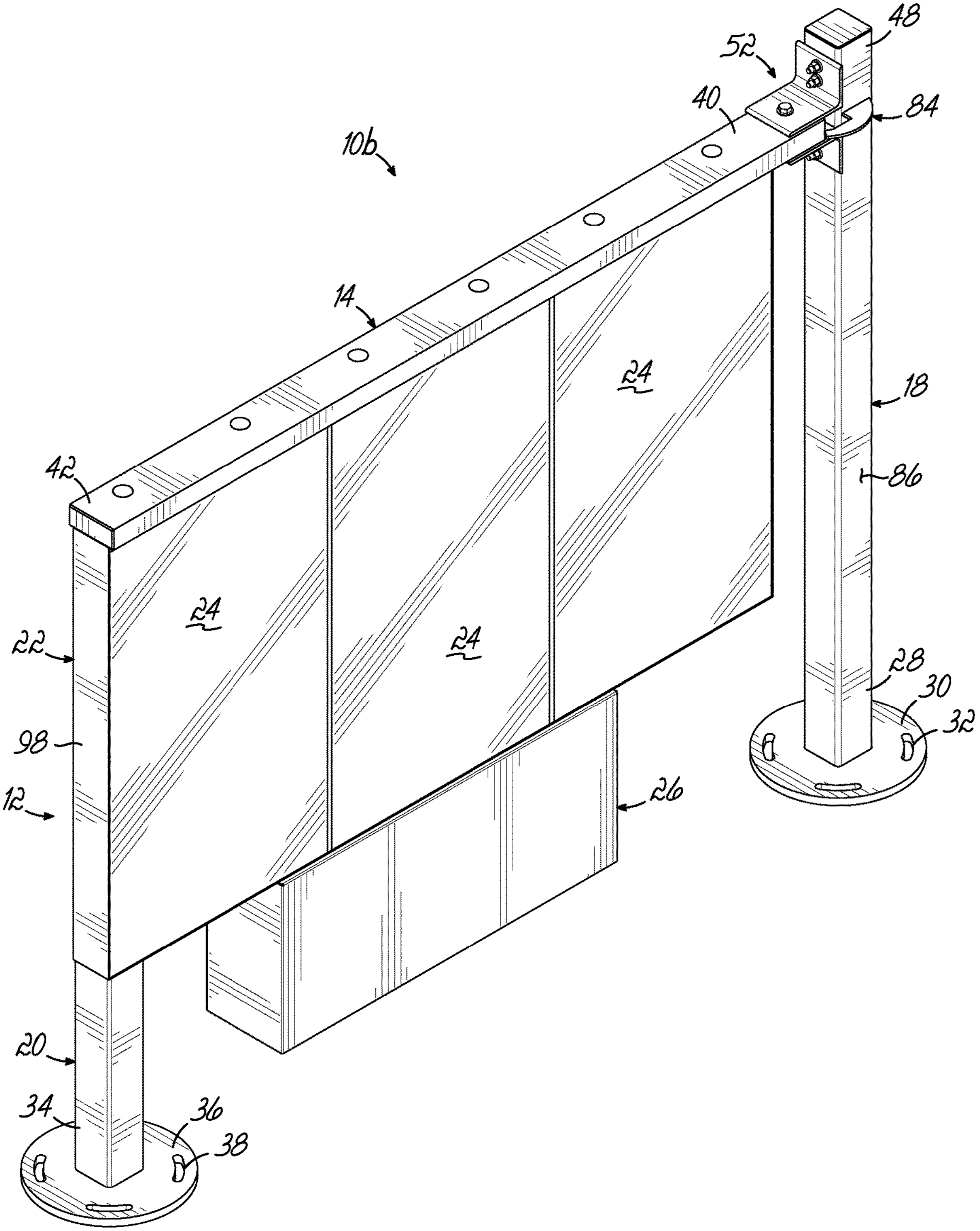
FIG. 7 is a perspective view of a front side of an outdoor digital menu board according to another embodiment of the invention.

Referring now to FIG. 7, wherein like numerals represent like features, an exemplary outdoor digital menu board 10*b* is shown in accordance with another embodiment of the present invention. The primary differences between the menu board 10*b* of this embodiment and the menu board 10 of the embodiment described above with regard to FIGS. 1-5, is that the menu board 10*b* includes an upper support arm 14 but not a lower support arm 16. As shown, the display assembly 22 is pivotably supported in an upright position by the upper support arm 14. Similar to the embodiment described above with regard to FIGS. 1-5, the display assembly 22 is pivotable between a first, latched position, where the display assembly engages with the support post 20, and a second, unlatched position, where the display assembly 22 is disengaged from the support post 20. To this end, the engagement between the display assembly 22 and the support post 20 may be one where the display assembly 22 is coupled to the support post 20.

Referring now to FIGS. 8-10C, wherein like numerals represent like features, an exemplary outdoor digital menu board 10*c* is shown in accordance with another embodiment of the present invention. The primary differences between the menu board 10*c* of this embodiment and the menu board 10 of the previously described embodiment relate to the addition of a shroud 120 to cover the control cabinet 26 and a portion of the support post 20. In this regard, the shroud 120 hides from view the control cabinet 26 and support post 20 so that the front of the menu board 10*c* remains appealing from the viewpoint of a customer, who can focus on the content of the display screens 24 for placing an order.

Figure 8:
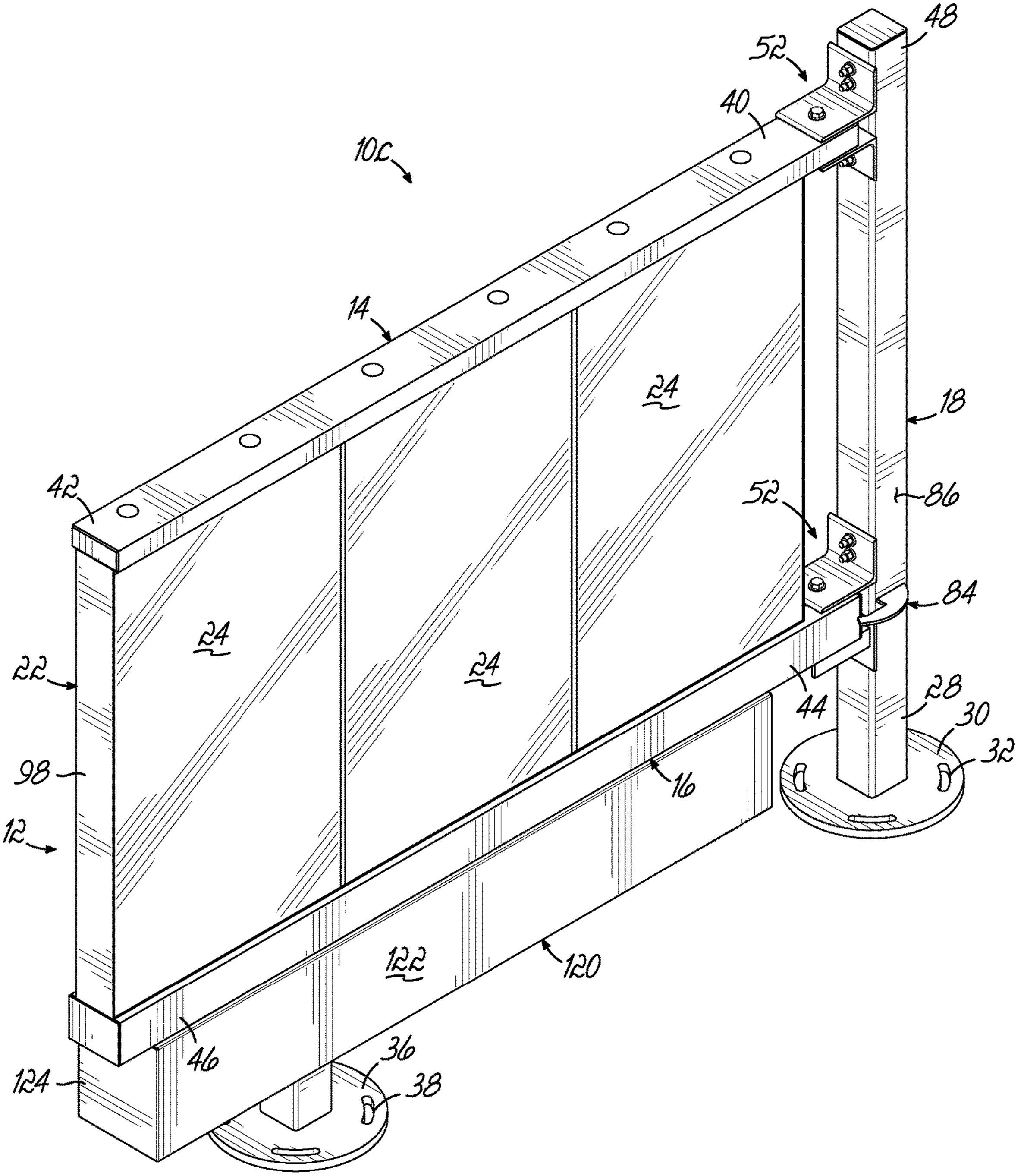
FIG. 8 is a perspective view of a front side of an outdoor digital menu board shown in a first, latched position, according to another embodiment of the invention.
Figure 9:
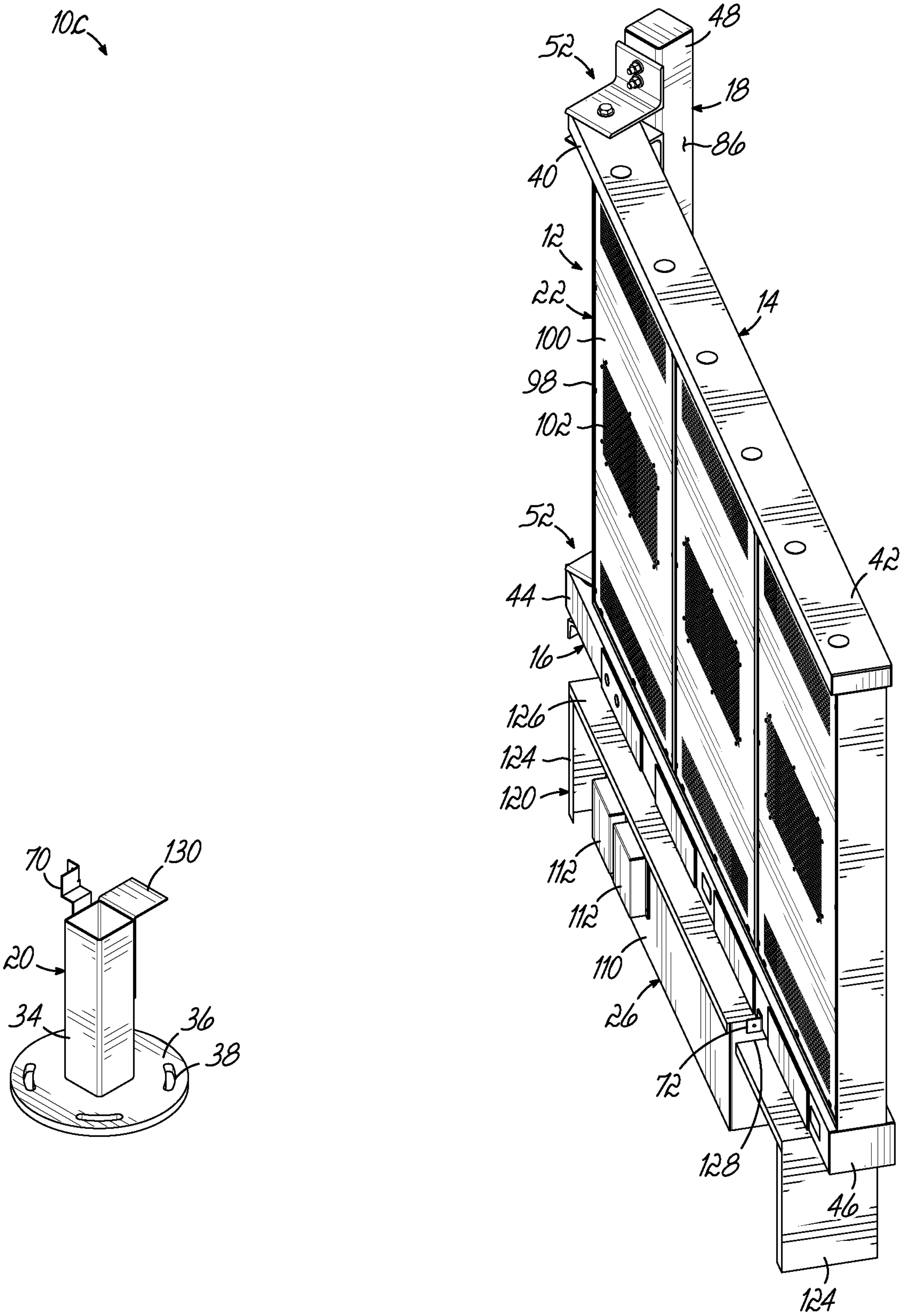
FIG. 9 is a perspective view of a rear side of the menu board shown in FIG. 8, showing the menu board in a second, unlatched position.

With reference to FIGS. 8 and 9, the display assembly 12 of the menu board 10 includes a frame 22 with horizontal and vertical support members 96, 98 and is configured to support one or more display screens 24 in an upright position. As shown, the display assembly 12 is pivotably supported above the ground by the upper support arm 14 and the lower support arm 16 which extend from the hinge post 18, in a parallel arrangement, to a point beyond the support post 20. To accommodate for the addition of the shroud 120, the support post 20 is positioned, in a lateral direction, closer to the hinge post 18 compared to the embodiment described above with regard to FIGS. 1-5. The proximal end 40 of the upper support arm 14 is pivotably coupled to the hinge post 18 with a pair of brackets 50, and the proximal end 44 of the lower support arm 16 is pivotably coupled to the hinge post 18 with a pair of brackets 50, 60. To limit pivotal movement, the menu board 10*c* further includes at least one stop 84 mounted to the hinge post 18 adjacent to the lower support arm 16. Similar to the embodiment described above with regard to FIGS. 1-5, the support post 20 may be provided with a locking mechanism 68 and the menu board 10*c* may be pivoted from a first, latched position, shown in FIG. 8, to a second, unlatched position, shown in FIG. 9.

With continued reference to FIGS. 8 and 9 the shroud 120 is mounted to an underside of the lower support arm 16 and is configured to cover and partially enclose the control cabinet 26 and support post 20. As shown, the shroud 120 is generally rectangular in shape and has a sheet metal-like body with a front wall 122, two sidewalls 124, and a top wall 126 for attachment to the underside of the lower support arm 16. The front and top wall 122, 126 of the shroud 120 have a length that extends between the proximal end 44 and distal end 46 of the lower support arm 16. The shroud 120 is mounted to the lower support arm 16 such that the front wall 122 is generally flush with a front-facing side of the lower support arm 16 (e.g., the side of support arm 16 that faces the drive-through lane or customer ordering point). The front wall 122 extends in a downward direction from the lower support arm 16 and terminates adjacent to the ground. In this regard, the front wall 122, sidewalls 124, and top wall 126 are sized to hide the control cabinet 26 from the view of a customer interacting with the menu board 10*c*. Thus, the size of the shroud 120 may be significantly larger compared to the control cabinet 26. As shown, the cabinet 26 is positioned within the confines of the shroud 120 and mounted to the lower support arm 16 such that the top wall 126 of the shroud 120 is positioned between the lower support arm 16 and the control cabinet 26. To cover and best conceal from view the support post 20 and control cabinet 26, the shroud 120 may have a width greater than a width of the lower support arm 16, display assembly 12, and cabinet 26, and may extend a distance beyond the rear side of the menu board 10*c* (e.g., the side of the menu board 10*c* that faces away from the drive through lane or customer ordering point).

Figure 10:
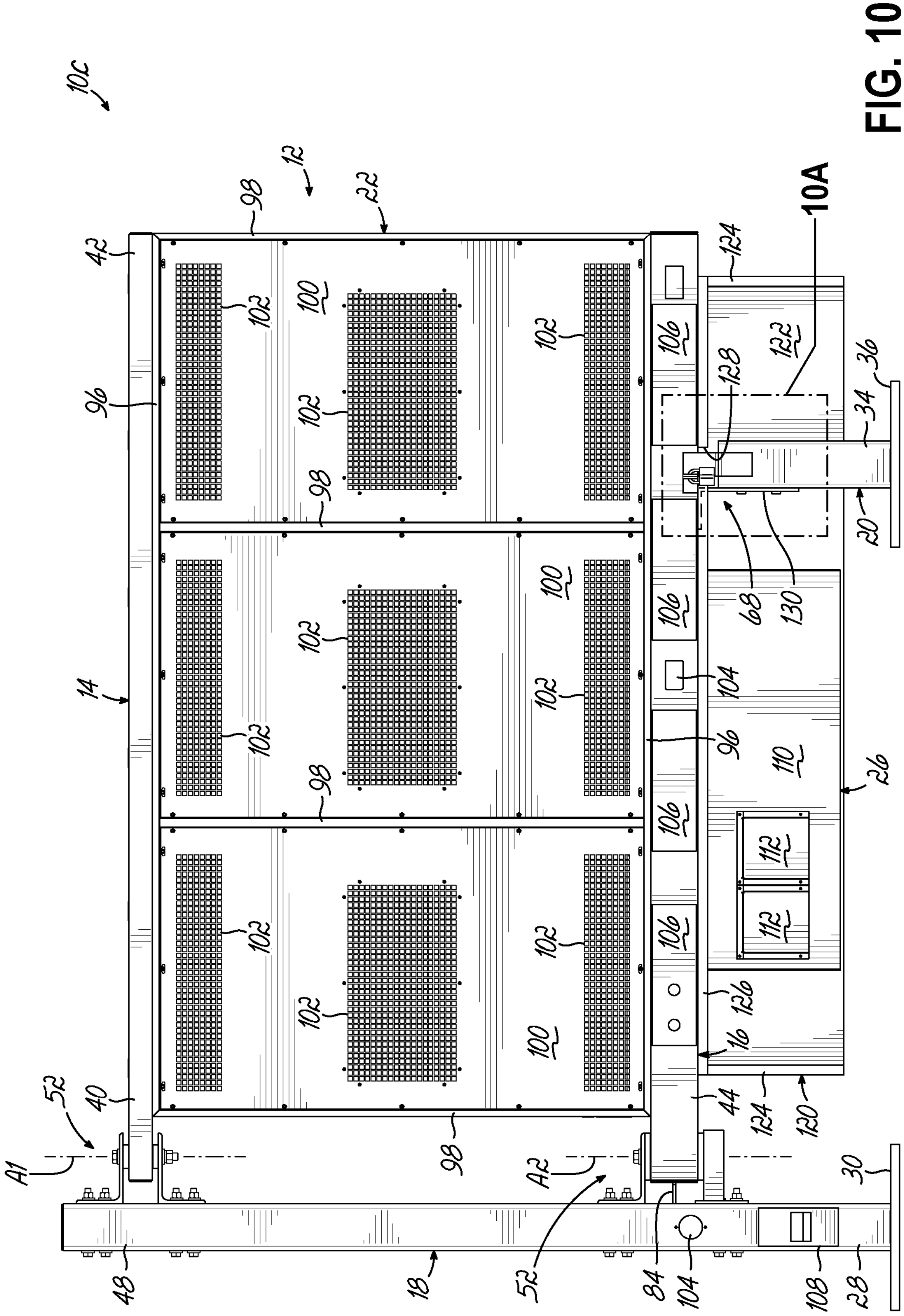
FIG. 10 is a rear view of the rear side of the exemplary menu board shown in FIG. 9.

As shown in FIGS. 9 and 10, the control cabinet 26 is positioned within the confines of the shroud 120. More particularly, no part of the control cabinet 26 extends beyond the confines of the shroud 120. However, in an alternative embodiment, part of the cabinet 26 may extend from the confines of the shroud 120, such as from the rear of the shroud 120, for example. In either case, to permit access to the door 110 of the control cabinet 26 for maintenance work, for example, the rear and bottom of the shroud 120 are open. The rear and bottom of the shroud 120 are also open to receive the support post 20 within the shroud 120 for latching the display assembly 12 thereto, as described in further detail below.

The shroud 120 is configured to receive and cover a portion of the support post 20 when the menu board 10*c* is in a latched position, as shown in FIG. 8. In this regard, the support post 20 may be spaced away from the hinge post 18 a distance such that the support post 20 is covered by the lower support arm 16 when the menu board 10*c* is in the last position. To this end, the support post 20 may be spaced closer to the proximal end 44 of the menu board 10*c* or distal end 46*c* of the menu board 10*c*. For example, the support post 20 may be spaced away from the hinge post 18 such that the proximal end 44 of the lower support arm 16 is positioned over the support post 20 when the menu board 10*c* is in the latched position. As shown, the top wall 126 of the shroud 120 includes a notch 128 for receiving the locking mechanism 68, and more particularly the first bracket 70, when the menu board 10*c* is in the latched position. As best shown in FIG. 10, when the menu board 10*c* is in the latched position, the first bracket 70 is positioned within the notch 128 and adjacent to the second bracket 72 to align locking tabs 74, 76. That way, the shank of the padlock (not shown) may be inserted through the apertures 78 to thereby couple the display assembly 12 to the support post 20.

With reference to FIGS. 9 and 10, the support post 20 of this embodiment includes a support bracket 130 configured to engage and support the display assembly 12 when in the latched position. In this regard, the support bracket 130 is preferably L-shaped and includes body 132 configured to be adjustably mounted to a side of the support post 20 facing the hinge post 18*c*. Preferably, the body 132 of the support bracket 130 has a width similar to that of the support post 20. However, the width of the support bracket 130 may vary as desired. The support bracket 130 further includes a tab 134 that extends from the body. In the embodiment shown, the lower support arm 16 does not contact the support post 20 when in the latched position. Rather, the lower support arm 16 "floats" over the support post 20 when in the latched position. Thus, to distribute the load of the display assembly 12 between the hinge post 18 and support post 20 when in the latched position, the support bracket 130 is mounted to the support post 20 with the tab 134 positioned at a height beyond a top 136 of the support post 20 to thereby engage and support the lower support arm 16 and display assembly 12. That way, when in the latched position, the display assembly 12 is partially supported by the support post 20.

Figure 10A:
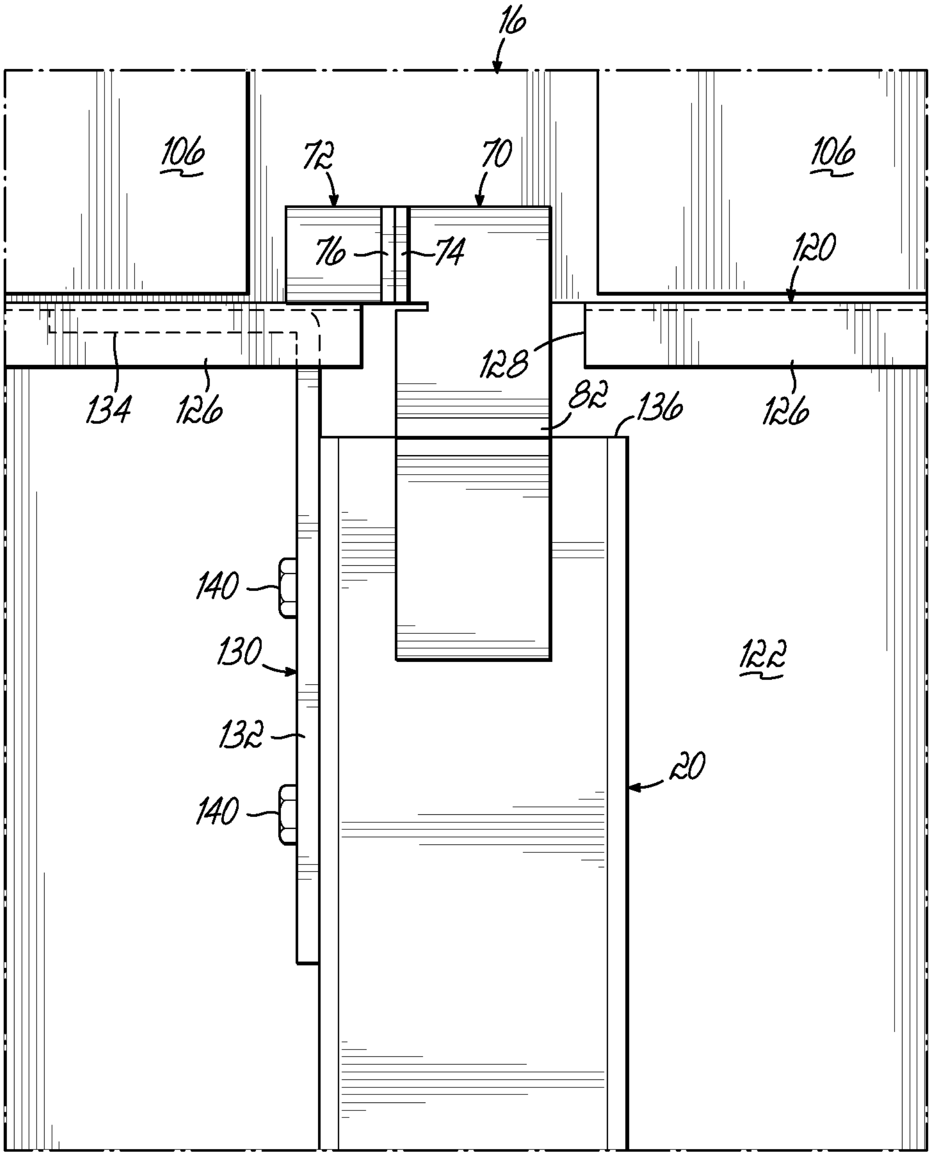
FIG. 10A is an enlarged view of a locking mechanism according to an exemplary embodiment of the invention.
Figure 10B:
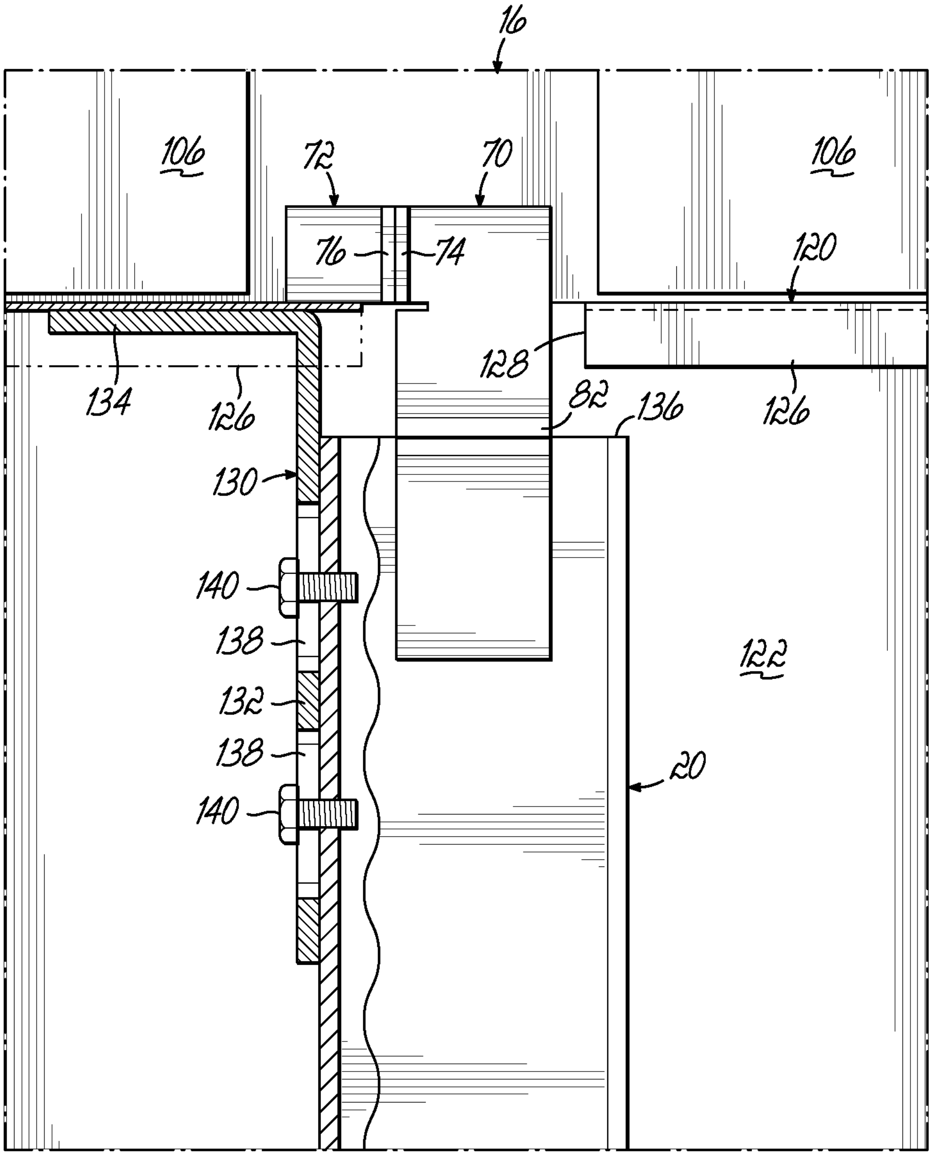
FIG. 10B is a cross-sectional view of the locking mechanism shown in FIG. 10A.
Figure 10C:
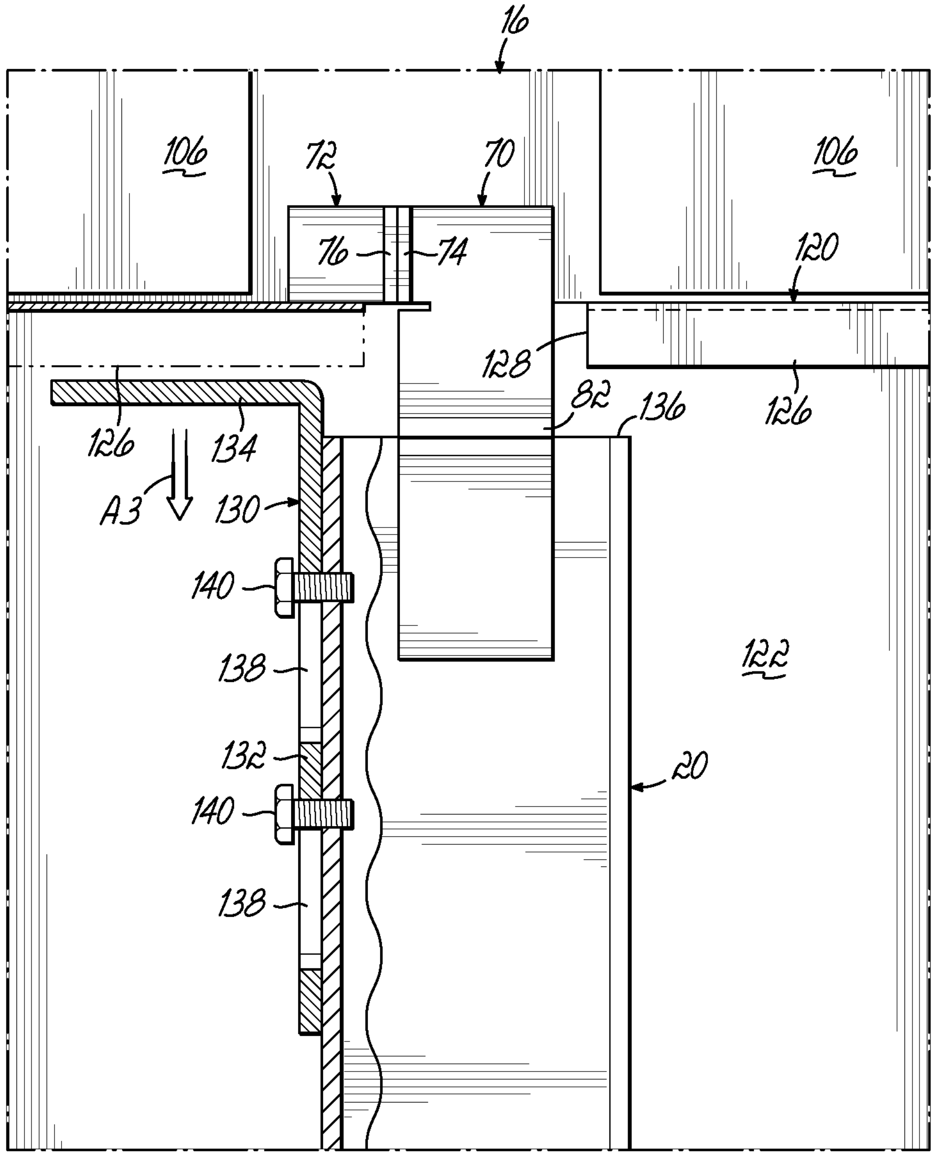
FIG. 10C is a cross-sectional view similar to FIG. 10B, illustrating adjustment of a support bracket.

Turning now to FIGS. 10A-10C, the body 132 of the support bracket 130 includes two vertically aligned elongated slots 138, each slot configured to receive a fasteners 140 such as bolt, screw, or other like fastener therethrough for adjustably mounting the support bracket 130 to the support post 20. In this regard, the elongated slots 138 allow for adjustment of the support bracket 130, in a vertical direction, along a length of the support post 20. To adjust the support bracket 130, the fasteners 140 may be loosened, without being fully removed from the support post 20, so that the support bracket 130 may be slid up or down along the support post 20, as desired. Once the support bracket 130 is placed in the desired position, the fasteners 140 may then be tightened to secure the support bracket 130 to the support post 20. For example, as shown in FIG. 10B, when the menu board 10*c* is in a latched position, the support bracket 130 may be adjusted or slid upwardly, in a direction towards the top 136 of the support post 20, to position the tab 134 above the top 136 of the support post 20 to thereby engage and support the lower support arm 16 and display assembly 12. However, to pivot the menu board 10*c* to an unlatched position, the support bracket 130 may need to be slid or adjusted downwardly, in a direction towards the base 34 of the support post 20, as indicated by arrow A3 in FIG. 10C, to position the tab 134 adjacent to the top 136 of the support post 20. Adjustment of the support bracket 130 in this manner may be necessary to avoid contacting the shroud 120 when pivoting the display assembly 12, for example.

Figure 11:
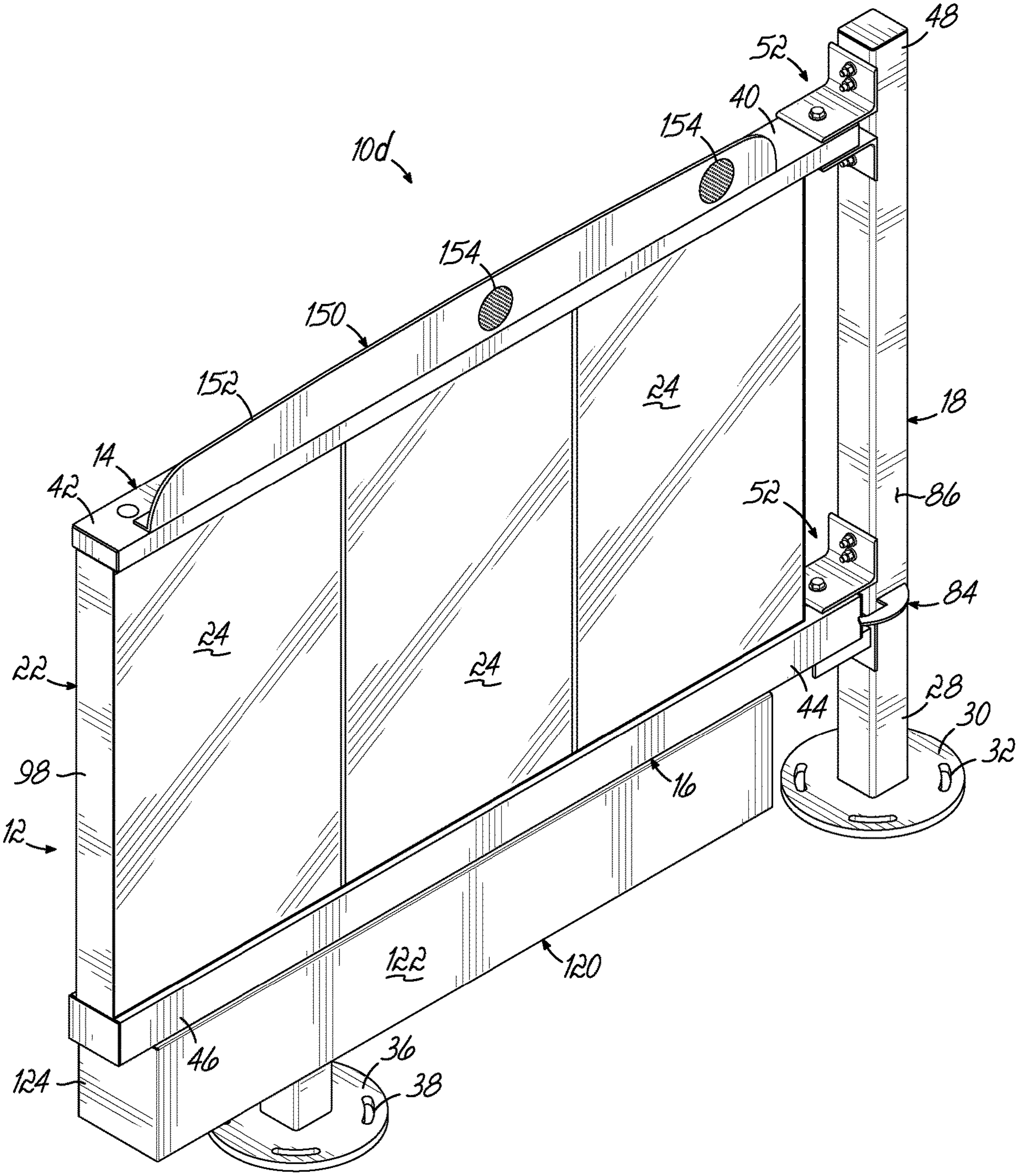
FIG. 11 is a perspective view of a front side of an outdoor digital menu board shown with a speakerphone assembly according to one embodiment of the invention.

Turning now to FIG. 11, wherein like numerals represent like features, a menu board 10*d* is shown having a speakermic or speakerphone assembly 150 according to one embodiment of the present invention. The speakerphone assembly 150 includes at least a speaker and/or microphone so that a customer may interact with an employee of the QSR via the menu board 10*d* to place an order, for example. The components of the speakerphone assembly 150 may be electrically connected, in a wireless or wired mode, with appropriate control electronics located in the control cabinet 26, for example. In the embodiment shown, the speakerphone assembly 150 is mounted to the upper support arm 14 and includes a housing 152 with one or more ports 154 which house a speaker and/or microphone unit. In this regard, the housing 152 is configured to mount directly to the upper support arm 14 with a nut and bolt combination, a screw, anchor, or other suitable structure, and the housing 152 extends along the upper support arm 14 a length from the proximal end 40 to the distal end 42. The speakerphone assembly 150 is mounted to the upper support arm 14 such that the one or more ports 154 housing the speaker and/or microphone units face outwardly on a front-facing side of the menu board 10*d* (e.g., the side of the menu board 10*d* that faces the drive-through lane or customer ordering point).

Figure 12:
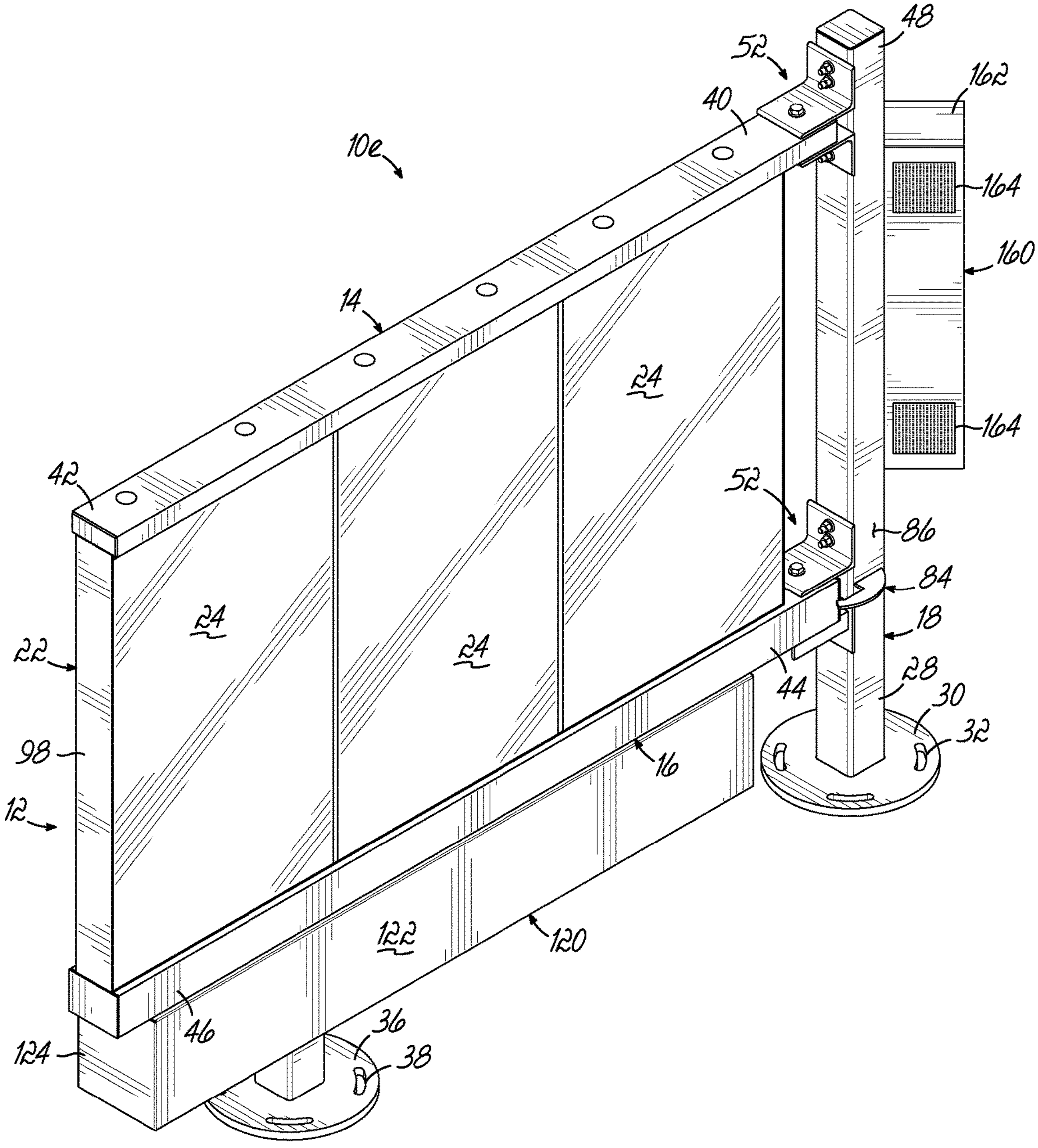
FIG. 12 is a perspective view of a front side of an outdoor digital menu board shown with a speakerphone assembly according to another embodiment of the invention.

Turning now to FIG. 12, wherein like numerals represent like features, an outdoor digital menu board 10*e* is shown in accordance with another embodiment of the present invention having a speakerphone assembly 160 mounted to the hinge post 18. As shown, the speakerphone assembly includes a housing 162 mounted directly to the hinge post 18 with a nut and bolt combination, a screw, anchor, or other suitable structure. The housing 162 is positioned along the hinge post 18 between the top 48 and base 28 of the hinge post 18. In this regard, the housing 162 may be generally rectangular in shape and include one or more ports 164 for housing each speaker and/or microphone unit. The speakerphone assembly 160 may be mounted to the hinge post 18 such that the one or more ports 164 housing each speaker and/or microphone unit face outwardly on a front-facing side of the menu board 10, similar to the embodiment described above with regard to FIG. 11, for example.

Figure 13:
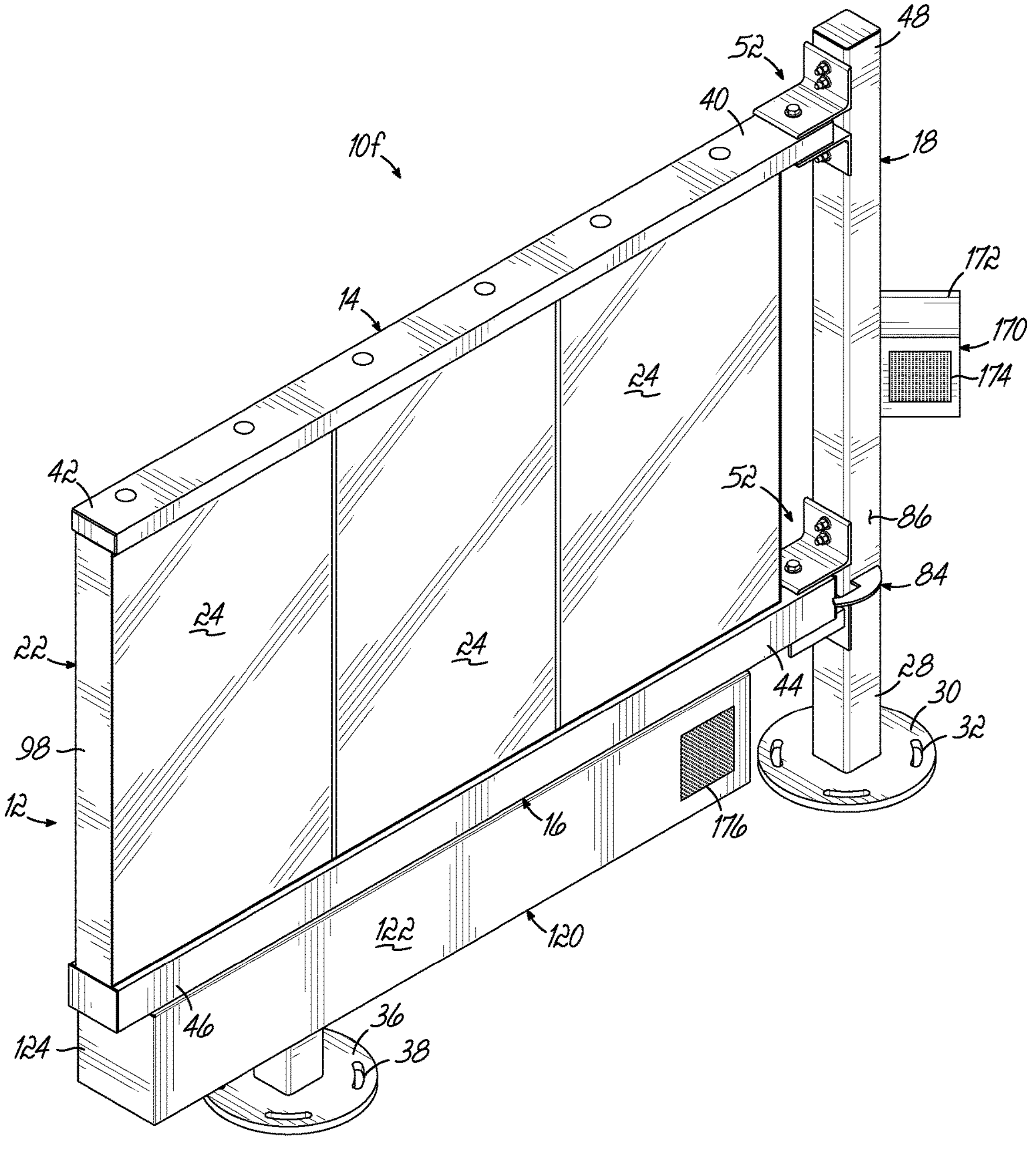
FIG. 13 is a perspective view of a front side of an outdoor digital menu board shown with a speakerphone assembly according to another embodiment of the invention.

Turning now to FIG. 13, wherein like numerals represent like features, an outdoor digital menu board 10*f* is shown in accordance with another embodiment of the present invention with a speakerphone assembly 170 mounted to the hinge post 18. As shown, speakerphone 170 of this embodiment includes a housing 172 that is generally square in shape and is attached to the hinge post 18 proximate to a midpoint between the top 48 and base 28 of the hinge post 18. The speakerphone assembly 170 of this embodiment includes only one port 174 for housing a speaker and/or microphone unit. In this regard, a second port 176 for housing a second speaker and/or microphone unit may be located on the shroud 120. More particularly, the port 176 may be formed in the front wall 122 of the shroud 120 so that the microphone and/or speaker unit faces the customer ordering point. The second microphone and/or speaker positioned in port 176 may also be electrically connected, in a wireless or wired mode, with appropriate control electronics located in the control cabinet 26 and/or appropriate electronics located in the speakerphone assembly 170.

With relatively few large structural components, the logistics and materials needed to ship menu the boards 10, 10*a*, 10*b*, 10*c*, 10*d*, 10*e*, and 10*f* described above are minimized. For example, all the components of the menu board 10*c* may be shipped in five boxes, for example. The display assembly 12 may be shipped in one box, the hinge post 18 support post 20 upper support arm 14 lower support arm 16 control cabinet 26 and shroud 120 may be shipped in three boxes, and the brackets 50, 60 and related fastening hardware may be shipped in one box as a hardware kit.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. An illuminated display device, comprising:
- a hinge post;
- a support post positioned in a laterally spaced relationship to the hinge post;
- at least one of an upper support arm or lower support arm being pivotably coupled to the hinge post and movable between a first position and a second position; and
- a display assembly including at least one digital display screen and being supported by the at least one of the upper support arm or lower support arm;
- wherein the display assembly or the lower support arm is positioned to overlie a top of the support post when moved to the first position.

2. The illuminated display device of claim 1, wherein the display device includes both the upper support arm and the lower support arm with the display assembly supported between the upper support arm and lower support arm in an upright position.

3. The illuminated display device of claim 1, wherein the at least one support arm is releasably coupled to the support post when moved to the first position.

4. The illuminated display device of claim 3, wherein the at least one support arm is releasably coupled to the support post with a locking mechanism.

5. The illuminated display device of claim 1, further comprising a control cabinet mounted to the lower support arm.

6. The illuminated display device of claim 1, wherein the display assembly is pivotable between the first position with the at least one support arm coupled to the support post and the second position with the at least one support arm uncoupled from the support post.

7. The illuminated display device of claim 1, further comprising a stop mounted to the hinge post and configured to abut the at least one support arm.

8. The illuminated display device of claim 1, further comprising a speakerphone assembly mounted to one of the upper support arm or lower support arm or hinge post.

9. The illuminated display device of claim 1, wherein the at least one support arm is pivotably coupled to the hinge post with a bracket and a support assembly.

10. The illuminated display device of claim 9, wherein the bracket and support assembly define a pivot joint and a vertical pivot axis for the at least one support arm.

11. The illuminated display device of claim 10, wherein the pivot axis is offset from the hinge post.

12. The illuminated display device of claim 1, further comprising a shroud mounted to the at least one support arm.

13. The illuminated display device of claim 12, wherein the shroud partially encloses the support post when in the first position.

14. The illuminated display device of claim 12, wherein the at least one support arm is releasably coupled to the support post with a locking mechanism, and the shroud includes a notch configured to receive part of the locking mechanism therein.

15. The illuminated display device of claim 12, wherein the support post includes a support bracket configured to support the at least one support arm when in the first position.

16. The illuminated display device of claim 15, wherein the support bracket is vertically adjustable along a length of the support post.

17. The illuminated display device of claim 1, wherein the lower support arm operatively engages with the support post when moved to the first position.

18. A method for servicing an illuminated display device installed adjacent a permanent structure, the illuminated display device comprising a hinge post, a support post positioned in a laterally spaced relationship to the hinge post, at least one support arm pivotably coupled to the hinge post and movable between a first position and an second position, and a display assembly including at least one digital display screen and being supported by the at least one support arm, wherein the display assembly or the at least one support arm is positioned to overlie a top of the support post when moved to the first position, the method comprising:
- pivoting the display assembly about the hinge post in a direction away from the permanent structure;
- servicing the illuminated display device;
- pivoting the display assembly about the hinge post in a direction towards the permanent structure; and
- positioning the display assembly or the at least one support arm to overlie the top of the support post.

19. The method of claim 18, wherein the least one support arm of the illuminated display device operatively engages with the support post when moved to the first position, the method further comprising the step of:
- disengaging the at least one support arm from the support post.

20. The method of claim 19, wherein the illuminated display device further includes a shroud mounted to the at least one support arm and a support bracket adjustably mounted to the support post, the step of disengaging the at least one support arm from the support post further comprising:
- loosening the support bracket and sliding the support bracket in a downward direction along the support post and out of the way of the shroud.

21. The method of claim 20, wherein the step of engaging the at least one support arm to the support post further comprises:
- sliding the support bracket in an upward direction along the support post to position the support bracket adjacent to the at least one support arm; and
- fixing the support bracket in place to the support post.

* * * * *